US012759608B1

(12) United States Patent
Liu et al.

(10) Patent No.: US 12,759,608 B1
(45) Date of Patent: Oct. 13, 2026

(54) IMAGE SENSOR MODULE

(71) Applicant: Amazon Technologies, Inc., Seattle, WA (US)

(72) Inventors: Zeng Shou Liu, Shrewsbury, MA (US); James Jehong Kim, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/346,356

(22) Filed: Sep. 30, 2025

(51) Int. Cl.

| | |
|---|---|
| ***G06K 15/00*** | (2006.01) |
| ***B62B 3/14*** | (2006.01) |
| ***B62B 5/00*** | (2006.01) |
| ***G06K 7/10*** | (2006.01) |

(52) U.S. Cl.
CPC .......... *B62B 5/0096* (2013.01); *B62B 3/1424* (2013.01); *B62B 3/1428* (2013.01); *G06K 7/10732* (2013.01); *G06K 7/10752* (2013.01); *G06K 7/10861* (2013.01); *G06K 7/1095* (2013.01)

(58) Field of Classification Search
CPC ............. G06K 7/10881; G06K 7/1095; G06K 7/10732; G06K 7/10752; G06K 7/10861; B62B 5/0096; B62B 3/1424; B62B 3/1426
USPC .......................................................... 235/383
See application file for complete search history.

(56) References Cited

U.S. PATENT DOCUMENTS

| | | | | |
|---|---|---|---|---|
| 9,622,326 | B1 * | 4/2017 | Devyver | G09G 3/3406 |
| 11,841,438 | B2 * | 12/2023 | Subasingha | G01S 7/4868 |
| 2017/0142314 | A1 * | 5/2017 | Moore | A61B 46/10 |
| 2018/0183990 | A1 * | 6/2018 | Chen | H04N 23/745 |
| 2020/0141716 | A1 | 5/2020 | Droz et al. | |
| 2021/0274084 | A1 * | 9/2021 | Hejl | H04N 23/745 |

FOREIGN PATENT DOCUMENTS

| | | | | |
|---|---|---|---|---|
| CN | 102324014 | * | 1/2012 | G06K 7/10841 |
| CN | 102324014 A | * | 1/2012 | G06K 7/10841 |

* cited by examiner

*Primary Examiner* — Daniel St Cyr
(74) *Attorney, Agent, or Firm* — Kilpatrick Townsend & Stockton LLP

(57) ABSTRACT

A method and apparatus for adaptive code scanning in smart shopping environments are disclosed. The system includes a smart shopping cart with an optical module comprising an illumination source and an image sensor, and a computing module. The computing module determines sensor and illumination frequencies and adjusts the illumination frequency so that the illumination source and image sensor alternate between aligned and misaligned frames. The image sensor scans codes within a designated area, and the computing module records the resulting scanning data for further processing.

20 Claims, 12 Drawing Sheets

IMAGE SENSOR MODULE

BACKGROUND

In recent years, the use of electronic codes displayed on mobile devices has become increasingly common, particularly in environments that support self-service transactions. Customers frequently present barcodes or QR codes on their smartphones to facilitate payments, access services, or redeem promotions. Many retail and service settings now employ optical scanning systems to read both electronic codes from mobile devices and traditional product barcodes. However, reliably capturing code information from electronic screens and supporting efficient self-service experiences present unique technical challenges.

BRIEF DESCRIPTION OF THE DRAWINGS

Various embodiments in accordance with the present disclosure will be described with reference to the drawings, in which.

DETAILED DESCRIPTION

Figure 1:
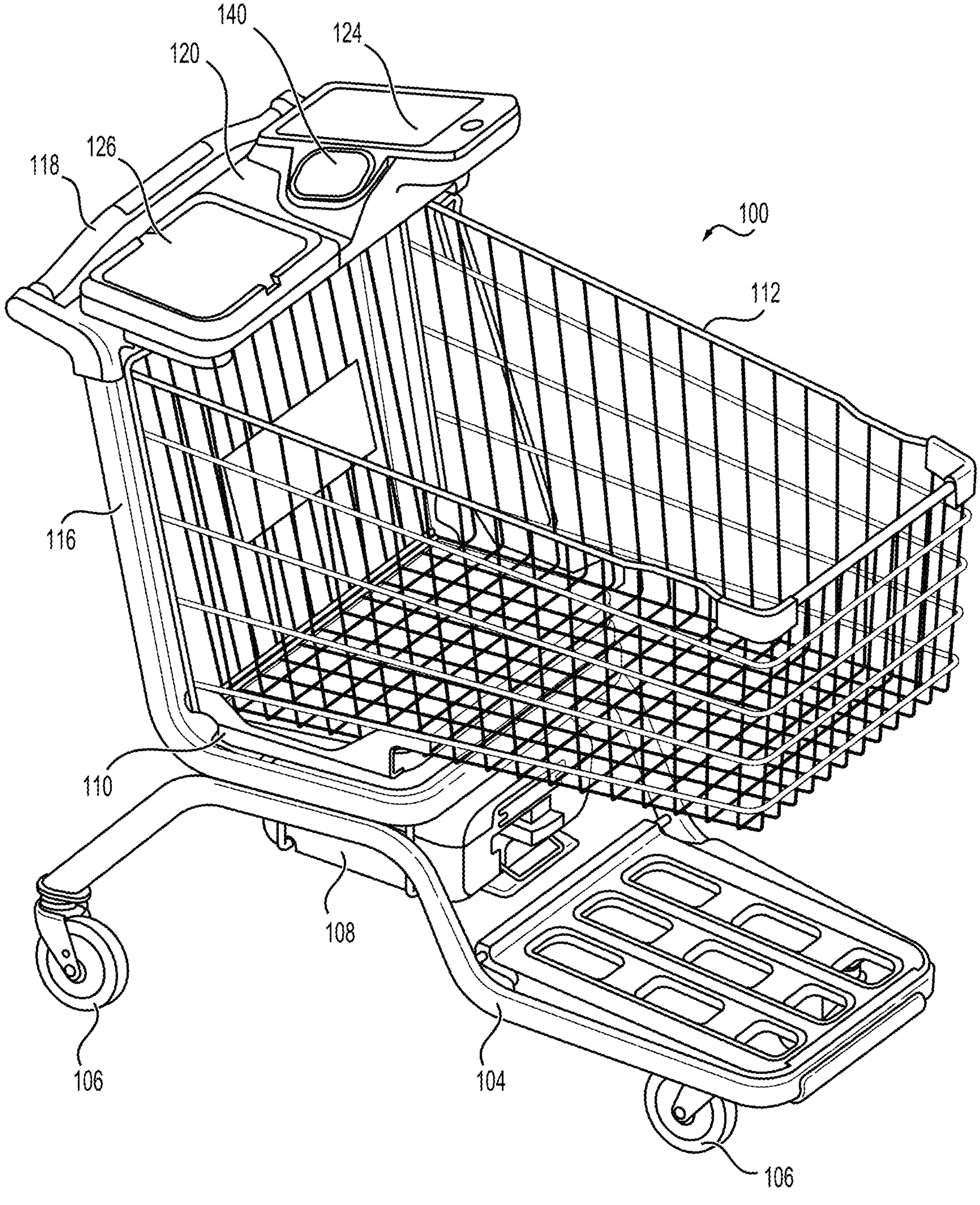
FIG. 1 illustrates a mobile apparatus for enabling customized retail environments, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for improving code scanning performance in smart shopping environments. In many retail settings, customers may utilize a smart shopping cart equipped with an optical module to scan both physical product barcodes and electronic codes, such as QR codes displayed on mobile devices, during the shopping process. The optical module may include an illumination source (e.g., a ring of light-emitting diodes) and an image sensor (e.g., a camera). The disclosed systems and methods address the technical challenges associated with reliably capturing both types of codes under varying environmental lighting conditions and movement conditions by adjusting the operational relationship between the illumination source and the image sensor. Additionally, the disclosed systems and methods address the technical challenges associated with reliably capturing electronic codes by dynamically adjusting the illumination frequency of the illumination source and phase delay between start of illumination pulse and start of image sensor exposure as items are presented for scanning.

In a particular example, a smart shopping cart includes a frame with wheels, an optical module comprising an illumination source and an image sensor, and a computing module. The computing module is configured to determine an image sensor frequency for the image sensor and an illumination frequency for the illumination source. The illumination frequency is adjusted such that aligned and misaligned image sensor frequencies occur in alternation. Additionally, the illumination frequency is adjusted such that the frequency is decreased as an item is presented for scanning. In some implementations, alignment of the illumination frequency with the image sensor frequency is performed in certain frames, while misalignment is performed in others. Specifically, the computing module alternates between frames in which the illumination source is aligned with the sensor (such that image data is captured while the illumination is on, or both the illumination source and the image sensor are active), and frames in which the illumination source is misaligned from the sensor (such that image data is captured while the illumination is off or either the illumination source or the image sensor is inactive while the other remains active). This alternating frame alignment and unalignment allows the system to acquire image data under both illuminated and ambient lighting conditions, thereby accommodating a variety of product types, code formats, and presentation scenarios. By using a misaligned long-exposure frame when imaging electronic codes on mobile devices, the computing module can apply auto exposure (auto gain) while suppressing glare and specular reflections from the illumination source. This prevents auto exposure from amplifying highlight artifacts, increasing code-reading accuracy and expanding the effective scanning range. The image sensor scans codes within a designated area, and the computing module records the resulting scanning data for further processing.

To illustrate, consider a scenario in which a customer uses the smart shopping cart to scan both product barcodes and electronic codes, such as QR codes displayed on a smartphone. Conventional code scanning systems frequently encounter significant challenges in reliably capturing and decoding these codes. For example, fixed illumination and sensor alignment may make it difficult to read electronic codes from smartphone screens due to glare or insufficient contrast, particularly when the illumination source is reflected by the screen. Conversely, scanning physical barcodes on moving products may require different lighting or timing conditions to avoid motion blur. The disclosed embodiments address these problems by adjusting the illumination frequency and its alignment state with the image sensor frequency, thereby enabling the system to alternate operational conditions for the image sensor and enhance the accuracy, reliability, and efficiency of code detection for both printed and electronic codes in diverse shopping scenarios.

In some examples, the system is configured to alternate between alignment and misalignment states by adjusting the relationship between the illumination frequency and the image sensor frequency. When the illumination source is aligned with the image sensor, the resulting exposure time of the sensor is shorter, which is particularly advantageous for accurately capturing barcodes on fast-moving products and minimizing motion blur. Conversely, when the illumination frequency is misaligned with the image sensor frequency, the sensor's effective exposure time can be extended, which is beneficial for capturing electronic codes displayed on mobile device screens, where increased exposure helps overcome issues like screen glare or insufficient ambient light. This alternation provides a practical solution to both the product barcode scanning and electronic code capture.

In some embodiments, the system may include a dedicated processor associated with the optical module, such as the illumination source and image sensor, that is configured to process the scanning data locally. Upon capturing code data, this processor also generates metadata summarizing the relevant information from the scan, rather than transmitting full image data or raw sensor outputs. The metadata is then sent to a second, main processor of the system for further operations, such as transaction processing or inventory management. This architecture reduces the volume of data transferred between the optical module and the main computing unit, thereby lowering overall power consumption and improving system responsiveness. By offloading initial data processing to a localized, lower-power processor, the disclosed system enables efficient operation suitable for battery-powered smart shopping carts and similar self-service platforms.

In some embodiments, the system may be configured to by dynamically adjusting the illumination frequency of the illumination source (and phase delay between start of illumination pulse and start of image sensor exposure) by detecting whether an item is within a scanning zone. The scanning zone (i.e., scanning region or area) may be determined by the illumination source, image sensor, and/or a proximity sensor and may define a region in which an item is to be scanned. For example, when an item is placed near the illumination source, the illumination frequency can be automatically modulated in response to input received from one or more proximity sensors or object detection mechanisms. For example, when a sensor detects that an object is proximate to the optical module, the computing module may decrease the frequency of the illumination. This lower frequency setting can enhance the ability of an imaging device or scanner to detect and accurately capture identifiers, such as barcodes, QR codes, or other machine-readable features, associated with the object. Conversely, when no object is detected near the optical module, the computing module may increase the illumination frequency to a higher value that minimizes or eliminates perceptible flickering effects for users interacting with the system and/or utilizing the container. Additionally, the illumination magnitude of the illumination source may stay consistent, so that there is not a spike in illumination during the transition.

The frequency at which light is emitted from a light source, such as a light-emitting diode (LED), has a direct impact on the perceptibility of flickering effects to the human eye. Specifically, when the emission frequency of the light source is relatively high, generally above the flicker fusion threshold of human vision, typically in excess of several hundred hertz, the resulting illumination appears continuous and stable, with no discernible flickering effect. This is advantageous for applications requiring visually comfortable ambient lighting. Conversely, when the emission frequency is reduced below this threshold, the human eye can detect temporal variations in brightness, resulting in a perceptible flickering effect. Notably, in certain applications such as barcode scanning or optical pattern recognition, it is desirable for an image sensor (e.g., a camera) or photodetector to capture distinct on-off transitions or periodic modulations of the light source. In such scenarios, operating the light source at a lower frequency enhances the ability of the image sensor to detect these transitions, thereby improving the accuracy and reliability of the scanning or imaging process. Thus, the embodiments are directed to dynamically adjusting frequency settings. For example, a higher frequency setting is employed during general illumination to eliminate flicker, while a lower frequency setting is utilized during scanning operations to facilitate effective image capture by the camera.

The embodiments described herein provide an improvement over conventional optical scanning methods, which typically increase light outputs and exposure, by enabling the dynamic adjustment of the emission frequency of a light source (i.e., the illumination source) in response to the real-time detection of an item in proximity to a scanning region. Specifically, the system incorporates one or more sensors configured to detect when an item or object approaches or enters the scanning area of the container. Upon such detection, a control circuit automatically transitions the modulation frequency of the light source from a high-frequency mode, optimized for continuous, flicker-free illumination, to a low-frequency mode that is optimized for enhanced detection by imaging sensors or cameras. This dynamic frequency adjustment is performed without manual intervention and in direct coordination with the operational state of the scanning system. By doing so, the embodiments can improve the reliability and accuracy of item identification through optimized signal acquisition, while minimizing power consumption and reducing the risk of erroneous readings caused by suboptimal lighting conditions.

In further embodiments, the system may be configured to support bidirectional transitions between high-frequency and low-frequency illumination settings based on real-time detection within the scanning zone (i.e., scanning region or area). When an item is detected proximate to the optical module or a scan is initiated, the computing module and/or control circuit may transition the illumination frequency (i.e., modulation frequency of the light source) from a high-frequency mode, optimized for continuous, flicker-free ambient illumination, to a low-frequency mode optimized for enhanced detection by an image sensor or scanner. Conversely, when the item is removed, a scan is completed, or no object is detected within the scanning zone, the computing module and/or control circuit may transition the illumination frequency from the low-frequency mode back to the high-frequency mode to restore stable, flicker-free illumination for users interacting with the system and/or utilizing the container. To reduce oscillation during intermittent detections, the system may implement hysteresis thresholds, minimum dwell times, and/or debounce intervals, and the transition may be executed as a controlled ramp or stepped change.

To preserve user-perceived brightness across frequency changes, the system may maintain substantially constant average optical power (or average illuminance at the target) even as the modulation frequency varies. Human visual perception primarily integrates light over time when the modulation is sufficiently fast, therefore maintaining average radiant flux prevents visible brightness changes. The system may achieve this by controlling the peak drive current to keep the product of peak brightness, pulse width, and frequency approximately constant (i.e., average optical power $P\_avg \approx I\_peak \times t\_pulse \times f$). In some implementations, if the frequency is lowered (longer period), the pulse width may be increased proportionally so that the duty cycle (pulse width divided by period) remains approximately constant. This keeps average light per unit time substantially unchanged and avoids visible flicker when the frequency remains above human flicker thresholds. If the frequency is lowered while pulses are shortened, the controller may raise the peak drive current (within eye-safety and thermal limits) so that the product $I\_peak \times t\_pulse \times f$ remains substantially constant. This maintains the average delivered light even as timing parameters change.

Additionally, the illumination magnitude of the illumination source may remain substantially consistent during such transitions so that there is not a spike in illumination.

In some examples, high-to-low transitions may be initiated by proximity sensor inputs, object detection cues from the image sensor (e.g., a request for periodic modulation), or user-initiated scanning commands, whereas low-to-high transitions may be triggered upon successful decode events, expiration of a scan timeout, removal of the object from the scanning region, or detection of stable ambient conditions. The illumination frequency may be governed by a closed-loop algorithm executed by the computing module and/or control circuit that monitors sensor confidence metrics and human-perceptible flicker criteria, enabling the system to automatically select and transition to the appropriate frequency band without manual intervention. By supporting both high-to-low and low-to-high transitions in real time, the embodiments maintain user comfort, optimize image capture performance for identifiers such as barcodes and QR codes, and minimize power consumption while reducing the risk of erroneous readings associated with suboptimal lighting conditions.

Turning now to the figures, FIG. 1 depicts a view of a mobile apparatus 100 for enabling customized retail environments, according to at least one example. The mobile apparatus 100 has a frame including a lower frame 104 and an upper frame 116. The upper frame 116 supports a handle 118. The lower frame 104 extends from a front to a rear of the mobile apparatus 100 and includes wheels 106 for riding along a supporting surface. The lower frame 104 supports a power unit 108 and a scale module 110.

The user-facing module 120 includes a sell-by-weight scale 126 for weighing items to add to the mobile apparatus 100 as well as the basket 112. The sell-by-weight scale 126 may be used to input items such as produce or other items sold according to their weight. The sell-by-weight scale 126 may include a single point load cell centered under a load surface of the sell-by-weight scale 126. The single point load cell of the sell-by-weight scale 126 may output an analog signal and/or include an embedded circuit board to digitize the analog signal and output a digital signal. The signal from the load cell of the sell-by-weight scale 126 may be conveyed to a computing device of the user-facing module 120, and information related to such sensor data may be presented on a user display 124 of the user-facing module 120.

The mobile apparatus 100 further includes an optical module 140, which is configured to facilitate efficient and accurate scanning of product barcodes and electronic codes within a designated scanning area. In some embodiments, the optical module 140 is mounted to the upper frame 116 of the mobile apparatus 100 in a location accessible to the user, such as adjacent to the basket 112 or user-facing module 120. However, the optical module 140 is not limited to use in the mobile apparatus 100. The optical module 140 may be incorporated into a variety of scanning devices, such as in-house scanners, mobile phone-based scanners, checkout station scanners or others, thereby enabling flexible integration with different operational environments.

The disclosed embodiments are suitable for scanning or otherwise imaging a variety of objects, including but not limited to one-dimensional codes (e.g., barcodes), two-dimensional codes (e.g., QR codes), other types of codes, items, and any other suitable object that may be imaged for the purposes described herein. The flexible architecture and operational logic enable the system 100 to support efficient and reliable code detection in a wide range of retail, self-service, and automated checkout environments.

Figure 2:
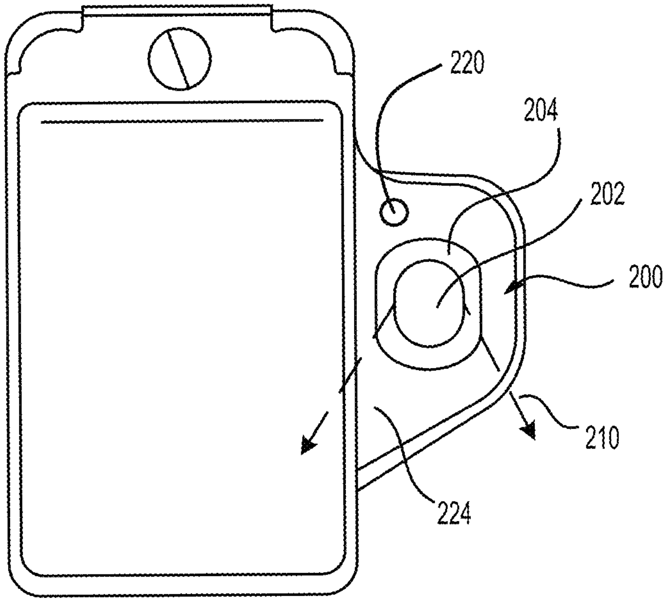
FIG. 2 illustrates an example optical module, according to at least one example.

FIG. 2 illustrates an example of an optical module 200, as described herein. The optical module 200 is similar to the optical module 140 shown in FIG. 1 and may be used to perform code scanning operations within the mobile apparatus. The optical module 200 comprises an image sensor 202, an illumination source 204, and a proximity sensor 220.

As illustrated in FIG. 2, the image sensor 202 is configured to capture image data or detect code information presented within the scanning area 210. In some embodiments, the image sensor 202 may include a camera, a photodiode array, a pulse illumination (PI) camera, or other suitable imaging technology capable of decoding one-dimensional, two-dimensional codes, such as barcodes or QR codes, or any other barcodes. The image sensor 202 is communicably coupled to a computing module for processing the captured scan data. The optical module 200 may function as a presentation scanning apparatus and, in certain embodiments, may be implemented as a stand-alone unit, meaning it operates independently (e.g., it is not physically integrated with the mobile apparatus 100 described with reference to FIG. 1). This stand-alone deployment enables flexible integration into a variety of retail or logistics environments, where the scanning apparatus may be used at fixed scanning stations, checkout counters, or other designated areas.

The illumination source 204 is configured to emit light into the scanning area 210 to enhance the visibility of codes and improve scanning accuracy. The illumination source 204 may include one or more light-emitting diodes (LEDs), pulse illumination (PI) lights, or other suitable lighting elements. In operation, the illumination source 204 can be controlled to adjust its emission frequency and its alignment with the image sensor 202, as described in further detail herein, to optimize code detection under varying ambient lighting and presentation conditions.

The proximity sensor 220 may function as an input device that continuously monitors the scanning area for the presence of items, packages, or electronic devices (such as smartphones displaying QR codes) intended for scanning. Once an item is detected, the proximity sensor 220 triggers the initiation of the scanning process.

The image sensor 202 may be positioned within the device housing 224 such that its field of view is directed toward and encompasses the scanning area 210. In some embodiments, the image sensor 202 is mounted so that its optical axis is substantially perpendicular to the plane of the scanning area 210, thereby maximizing its ability to capture high-resolution images or detect reflected light from codes presented within the scanning area. The positioning of the sensor 202 may be further designed to account for the size and shape of the housing 224, as well as the anticipated orientation of items to be scanned.

In certain embodiments, the illumination source 204 may surround the image sensor 202, for example, as an annular array or ring of light-emitting elements encircling the sensor, as illustrated in FIG. 2. In this configuration, the illumination source 204 is structurally supported by, or integrated with, the housing 224 in such a manner that it projects light into the scanning area 210 from multiple angles relative to the sensor's optical axis. This arrangement ensures uniform and consistent illumination across the entire scanning area 210, thereby minimizing shadows, glare, or uneven lighting that could otherwise impede the sensor's ability to accurately detect or decode information from presented items. The surrounding configuration of the illumination source 204 relative to the image sensor 202 further allows for precise alignment between these components, such that the sensor may capture images or detect signals during periods of optimal lighting (for example, during specific pulse intervals of a pulse illumination cycle).

In certain embodiments, the proximity sensor 220 is continuously operated to detect movement of items near the optical module 200. The proximity sensor 220 may generate sensor data that indicates whether an item or object is within a threshold range of distances from the optical module 200, and trigger the illumination source 204 to begin illuminating light and the image sensor 202 to begin generating image data. To improve the quality of the image data, the illumination frequency of the illumination source 204 may be adjusted based on input from the proximity sensor 220 detecting that an item is near the optical module 200. As an item moves closer to the optical module 200, the illumination frequency can be decreased for better image quality. As an item moves further from the optical module 200, the illumination frequency can be increased to improve or eliminate a potential flickering effect. Additionally, the illumination magnitude of the illumination source 204 may stay consistent, so that there is not a spike in illumination during the transition.

The image data generated by the image sensor 202 may be analyzed by a software component to determine whether an item is being placed near the optical module 200 for scanning. Various techniques may be utilized to process image data for identifying the item identifier of the item, such as text recognition, object recognition, and/or other techniques. Upon determining the item identifier, such as determining that the item corresponds to "Strawberry Yogurt," the software components on the cart may store an indication that the item identifier was added to the cart, or removed from the cart, and update a virtual shopping cart accordingly.

According to some embodiments, the frequency at which the illumination source 204 operates may be either discretely or continuously adjustable, depending on system requirements and design considerations. For example, one or more components of the optical module 200 may toggle the modulation frequency between two discrete states: a relatively high frequency, such as within the range of approximately 10 to 20 kilohertz (kHz), and a relatively low frequency, such as within the range of approximately 15 to 30 hertz (Hz). The high-frequency setting is selected to be above the flicker fusion threshold of human vision, generally accepted to be several hundred hertz, so as to minimize or eliminate perceptible flickering effects for users interacting with or operating the optical module 200. Conversely, the lower-frequency setting is chosen to be within a range that maximizes the temporal resolution of cameras 102(1) and 102(2). In alternative embodiments, the system may be configured to continuously or incrementally adjust the frequency of illumination across a spectrum bounded by a lower limit (e.g., approximately 15 Hz, below which flickering becomes readily perceptible to the human eye) and an upper limit (e.g., approximately 20 kHz, above which no flicker is perceived and electrical switching losses or electromagnetic interference may become limiting factors). The particular frequency or range selected may be determined algorithmically based on real-time sensor data, operational context, or user-defined preferences. In some examples, the techniques described herein may enable and auto exposure (auto gain adjustment) without amplifying the glare and reflection of the illumination source, which may further improve the accuracy and scanning range of the code reader.

In further examples, low-to-high transitions may be initiated when the proximity sensor 220 indicates that the item has moved beyond the threshold range, when a successful decode is reported by the image sensor 202 or associated software components, or upon expiration of a scan timeout without additional proximity events. In response, the computing module and/or control circuit may command the illumination source 204 to increase the illumination frequency (i.e., modulation frequency) from a relatively low setting (e.g., approximately 15-30 Hz) toward a relatively high setting (e.g., approximately 10-20 kHz) either as a smooth, continuous ramp or in discrete steps (e.g., approximately 20 Hz to 200 Hz to 2 kHz to 15 kHz) over a controlled interval (e.g., tens to hundreds of milliseconds per step), while maintaining a substantially consistent illumination magnitude so that there is not a spike in illumination during the transition. Throughout this change, the system may preserve substantially constant average optical power (and therefore user perceived brightness) by regulating duty cycle and/or peak drive current such that the product of peak brightness, pulse width, and frequency remains approximately constant (P_avg≈I_peak×t_pulse×f). In some implementations, duty cycle preservation may be used (e.g., proportionally increasing pulse width as period increases) to keep average light per unit time stable; in other implementations, peak intensity compensation may be used (e.g., modestly increasing peak current while shortening pulse width) within thermal and eye safety constraints. To mitigate oscillation, the system may apply hysteresis thresholds to proximity sensor 220 inputs and image sensor 202 cues, and enforce minimum dwell times at the lower-frequency setting to allow cameras 102(1) and 102(2) to complete acquisition before returning to the higher-frequency setting for flicker-free ambient illumination.

While the above describes an embodiment in which the illumination source 204 surrounds the sensor 202 in an annular or ring configuration, other arrangements are also contemplated. For example, the illumination source 204 may comprise a linear light bar or a series of light bars positioned adjacent to, above, below, or around the image sensor 202, oriented to direct light into the scanning area 210. In some embodiments, multiple light bars may be arranged at different angles or locations about the periphery of the scanning area to provide tailored illumination profiles, such as directional lighting for specific use cases or to accommodate unusually shaped scanning areas.

The image sensor 202 itself may take various forms, including, but not limited to, a charge-coupled device (CCD), a complementary metal-oxide-semiconductor (CMOS) sensor, or an array of photodiodes. In some alternative embodiments, multiple image sensors 202 may be provided to capture images from different perspectives or to increase scanning area coverage. Likewise, the illumination source 204 may utilize other suitable lighting technologies, such as laser-based illumination, organic LEDs, or combinations thereof, to further optimize performance for particular scanning applications or environmental conditions.

Figure 3:
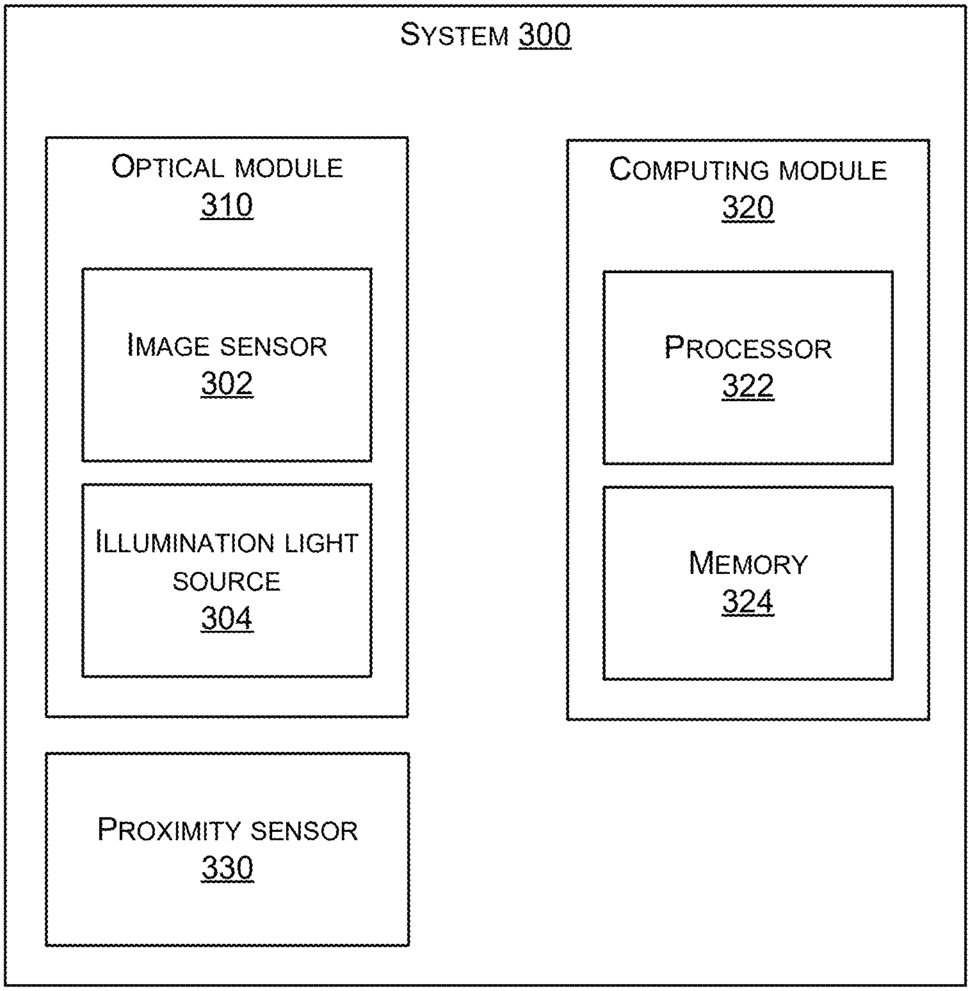
FIG. 3 illustrates an example block diagram of a scanning system that includes an optical module and a computing module, according to at least one example.

FIG. 3 illustrates an example system 300 for code scanning in a smart shopping environment, as described herein. The system 300 includes an optical module 310, a computing module 320 and a proximity sensor 330. The optical module 310, which is similar to the optical module 140 described in connection with FIG. 1, comprises an image sensor 302 and an illumination source 304. The image sensor 302 is configured to scan codes, such as barcodes or QR codes, within a designated scanning area illuminated by the illumination source 304. The computing module 320 includes a processor 322 and a memory 324, which may be implemented as one or more non-transitory computer-readable storage media storing instructions that, when executed by the processor 322, cause the system 300 to perform a sequence of operations for efficient code scanning. The computing module 320 can either be attached directly to the mobile apparatus 100 or be located remotely, such as on a server that communicates with the mobile apparatus 100. The proximity sensor 330 may function as an input device that continuously monitors the scanning area for the presence of items, packages, or electronic devices (such as smartphones displaying QR codes) intended for scanning. Once an item is detected, the proximity sensor 330 triggers the initiation of the scanning process.

The image sensor 302 may be implemented as a camera, a photodiode array, a pulse illumination (PI) camera, or any other suitable imaging device capable of capturing image data or detecting code information within the scanning area 210. The processor 322 may determine a image sensor frequency for the image sensor 302, wherein the image sensor frequency initiates each scan by the image sensor 302 to scan the designated scanning area 210. As used herein, "image sensor frequency" refers to the rate or periodic interval at which the image sensor 302 is triggered to capture images or perform scans; for example, a sensor frequency of 30 Hz means the sensor performs 30 scans per second. The term "determining" as used herein may include deriving the image sensor frequency using any suitable means, such as calculating based on system parameters, accessing predefined values from memory 324, determining the frequency from another module in response to a query, or any other appropriate method for establishing or selecting operational frequencies.

Similarly, the processor 322 may determine an illumination frequency for the illumination source 304, wherein the illumination frequency initiates each activation of the illumination source 304 to illuminate the scanning area. "Illumination frequency" as used herein refers to the rate or periodic interval at which the illumination source 304 is activated or pulsed to provide light for the scanning area; for example, an illumination frequency of 105 Hz means the light source is activated 105 times per second. "Determining" the illumination frequency may likewise involve calculating, accessing, receiving, or otherwise identifying the appropriate frequency value based on system requirements or scanning conditions. According to some embodiments, the processor 322 is operatively coupled to the proximity sensor 330 configured to detect the presence of objects, such as items to be scanned, within the designated scanning area. As the proximity sensor 330 determines that an item has entered or is sufficiently close to the scanning area, the processor 322 may dynamically adjust the illumination frequency of the illumination source 304 and phase delay between start of illumination pulse and start of image sensor exposure in response to this detection event. Specifically, the illumination frequency may be decreased from a default or standby value to a lower frequency that is better suited for optimal scanning and image acquisition, thereby reducing glare, enhancing contrast, or accommodating particular code formats or item surfaces.

According to some embodiments, the frequency at which the illumination source 304 operates may be either discretely or continuously adjustable, depending on system requirements and design considerations. For example, one or more components of the optical module may toggle the modulation frequency between two discrete states: a high frequency, a relatively high frequency, such as within the range of approximately 10 to 20 kilohertz (kHz), and a relatively low frequency, such as within the range of approximately 15 to 30 hertz (Hz). In certain implementations, the system may also employ an intermediate scanning frequency, for example, approximately 105 Hz that is automatically selected when a product is detected in front of the scanner to improve temporal modulation for image capture and decoding, while the normal (standby) frequency remains in the kilohertz range to provide a better user experience with continuous, flicker-free illumination. Alternatively, the modulation frequency may be continuously adjusted across a bounded spectrum to accommodate varying ambient conditions and decoding requirements. The high-frequency setting is selected to be above the flicker fusion threshold of human vision, generally accepted to be several hundred hertz, so as to minimize or eliminate perceptible flickering effects for users interacting with or operating the optical module.

Figure 4:
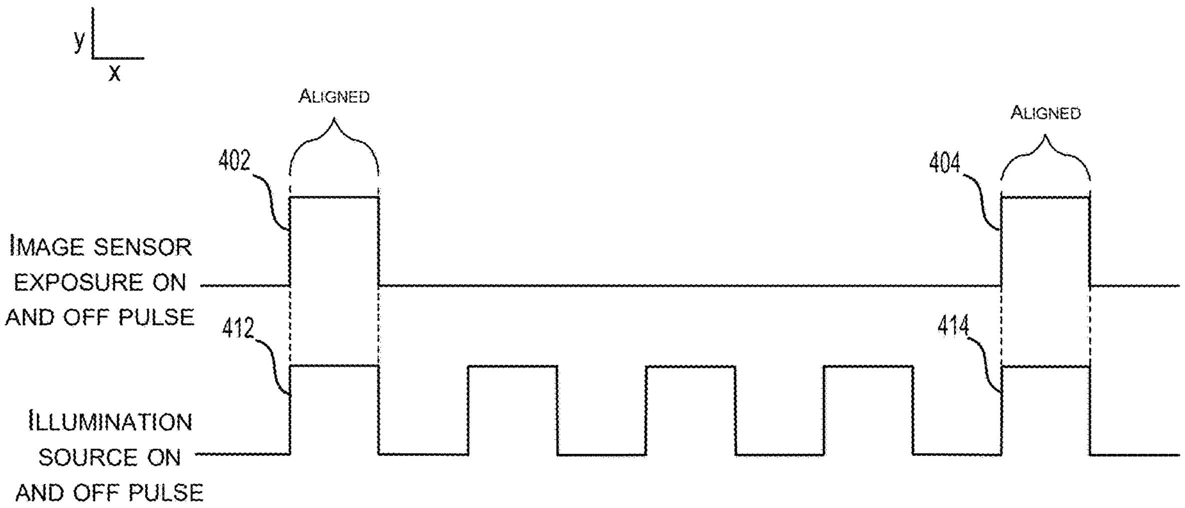
FIG. 4 illustrates a conventional timing scheme for an image sensor and an illumination source, according to at least one example.

According to some embodiments, the illumination frequency is adjusted such that the image sensor frequency and the illumination frequency are intermittently aligned, with one or more misaligned frames occurring between aligned frames. In some implementations, this adjustment comprises alternately operating in aligned and misaligned frames, for example by alternating the alignment state for each frame to optimize scanning performance under varying conditions. The aligned frames are frames in which the illumination source and the image sensor are both active, and misaligned frames are frames in which one of the illumination or the image sensor is inactive while the other of the illumination source or the image sensor is active. FIG. 4 illustrates a conventional timing scheme in which the image sensor 202 and the illumination source 204 operate in a fully aligned manner. In this example, the image sensor 202 exposure on pulses 402 and 404 are aligned with the illumination source on pulses 412 and 414, such that each activation of the image sensor 202 is matched by a concurrent activation of the illumination source 204. As a result, the exposure period of the image sensor 202 coincides with the period during which the illumination source is active for every frame captured. This approach ensures maintaining a stable and fixed timing relationship between the image sensor 202 and the light source 204 throughout the scanning sequence as depicted in FIG. 4.

Figure 5:
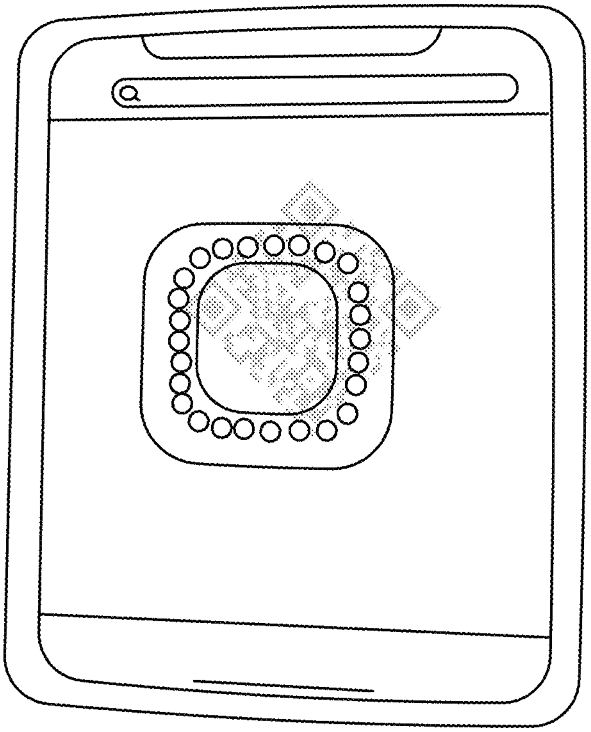
FIG. 5 illustrates an example image captured by an image sensor while scanning a QR code displayed on a cell phone using the conventional alignment scheme.

FIG. 5 illustrates an example image captured by an image sensor 202 while scanning a QR code displayed on a cell phone using the conventional alignment scheme described above with reference to FIG. 4. As depicted, the image reveals significant overlap between the reflection of the illumination source from the surface of the cell phone and the area containing the QR code. The reflected glare from the illumination source is much brighter than the QR code itself, resulting in the QR code region appearing relatively dark and lacking in detail. This effect is particularly pronounced when the cell phone's screen brightness is set to a lower level. This pronounced contrast and glare obscure critical features of the QR code, making it difficult for the scanning system to accurately detect and decode the information encoded therein.

Figure 6:
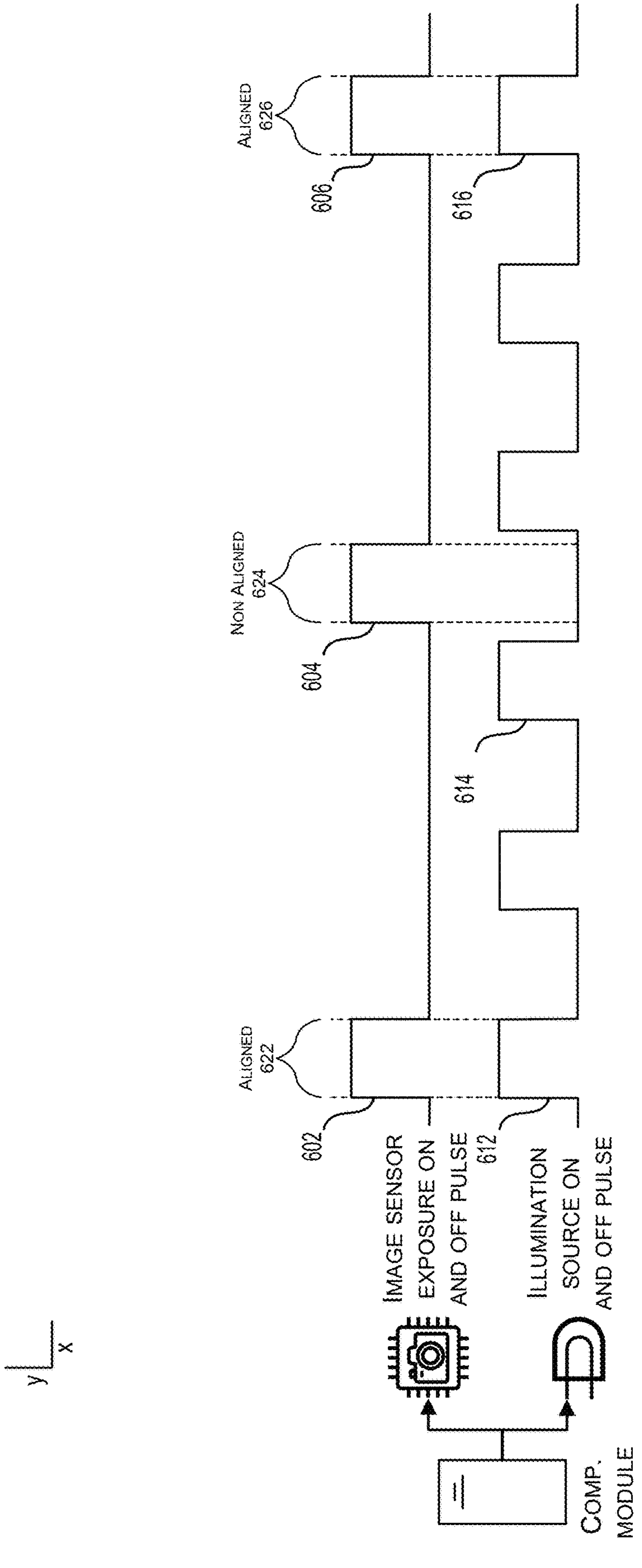
FIG. 6 illustrates an exemplary timing arrangement in which the alignment state between the image sensor and the illumination source alternates from frame to frame, according to at least one example.

In contrast to the conventional aligned timing scheme depicted in FIG. 4, FIG. 6 illustrates an exemplary timing arrangement in which the alignment state between the image sensor 202 and the illumination source 204 alternates from frame to frame. In this example, three image sensor on pulses—labeled as 602, 604, and 606—are shown, along with three illumination source on pulses—labeled as 612, 614, and 616. In this arrangement, the image sensor on pulses 602 and 606 are temporally aligned with the illumination source on pulses 612 and 616, representing a aligned frames 622 and 626 in which the sensor's exposure period coincides with the illumination period. In contrast, other frames, such as those involving image sensor on pulse 604 correspond to a misaligned frame 624: for example, image sensor on pulse 604 occurs in the absence of a corresponding illumination source on pulse, and image sensor on pulse 604 is offset from illumination source on pulse 614. This alternating pattern of aligned frames 622 and 626 and misaligned frame 624 enables the system to capture images both under full illumination (aligned) and under conditions where the sensor exposure is intentionally offset from the illumination event (misaligned), as depicted in FIG. 6.

It will be appreciated that the alignment configurations depicted in FIG. 6 are merely illustrative, and the aligned and misaligned statuses are not limited to these specific examples. In other embodiments, the aligned and misaligned states may correspond to periods of full, partial, or no overlap between the image sensor exposure on pulses and the illumination source on pulses. For instance, the aligned state may be characterized by either complete or partial overlap of the image sensor exposure pulse and the illumination source on pulse, whereas the misaligned state may be defined by either a lack of overlap between the image sensor exposure pulse and the illumination source on pulse, or by a partial overlap that is less than that of the aligned state. The degree of overlap between the image sensor exposure on pulses and the illumination source on pulses may vary in accordance with the requirements of particular implementations.

The timing arrangement illustrated in FIG. 6 effectively addresses and mitigates the reflection and glare problems that can occur with conventional aligned schemes, as shown in FIG. 4 and exemplified in the image of FIG. 5. In the arrangement of FIG. 6, the system alternates between aligned frames 622 and 626 in which the image sensor frequency and the illumination source frequency are aligned (e.g., image sensor exposure on pulses 602 and 606 and illumination source on pulses 612 and 616) and misaligned frames 624 in which image sensor frequency and the illumination source frequency are intentionally misaligned (e.g., image sensor exposure on pulse 604 without a corresponding illumination source on pulse). During misaligned frames, the image sensor exposure pulse is offset from the illumination source on pulse, allowing image capture to occur when direct reflection and glare from the illumination are minimized or absent.

This selective misalignment enables the image sensor to acquire images of QR codes displayed on electronic devices, such as cell phones, with reduced interference from intense reflected light. As a result, the relative brightness and detail of the QR code region are enhanced compared to the surrounding glare, thereby improving contrast and facilitating more reliable detection and decoding of the electronic code. By capturing at least some frames under these misaligned conditions, the system can obtain images in which the visual distinction between the code and the reflected illumination is significantly improved.

In addition to these benefits for electronic displays, the alternating alignment scheme illustrated in FIG. 6 also provides technical advantages for scanning other types of codes, such as barcodes printed on physical items. During aligned frames, when the illumination source is activated in temporal alignment with the image sensor's exposure period, the system ensures that objects within the scanning area—such as packaged goods, labels, or merchandise—are optimally illuminated at the moment of image acquisition. This aligned illumination enhances image clarity, improves code legibility, and increases the likelihood of successful detection and decoding for barcodes and other printed codes on physical items.

In certain configurations, the illumination frequency may be set so that alignment with the image sensor frequency occurs once every predetermined number of frames, such as once per two or more frames. For example, the image sensor frequency may be set to about 30 Hz and the illumination frequency may be maintained at a consistent frequency of about 120 Hz or 105 Hz, such that the alignment and misalignment pattern is achieved in accordance with the desired operational cycle.

It should be understood that the described alignment and misalignment schemes, as well as the operational settings for illumination and image sensor frequency, are not limited to the specific examples illustrated above. The approach may be adapted to different scanning requirements, code types, and environmental conditions as needed.

Although alternating between aligned and misaligned states of the illumination and sensor frequencies can reduce glare and reflection during code scanning, scanning fast-moving physical product barcodes may still result in motion blur. To address this, in some embodiments, the system is configured to dynamically adjust exposure time, analog and/or digital gain settings, sensitivity settings and pixel binning settings of image sensor to the current aligned state of the illumination frequency.

In some embodiments, alignment of the illumination frequency with the image sensor frequency is performed for a shorter exposure time, while misalignment is performed for a longer exposure time, with the first exposure time being longer than the second exposure time. The longer, misaligned exposure time allows the image sensor to capture more light in scenarios where codes are dim or presented on electronic screens, thereby enhancing image quality and facilitating reliable decoding. In contrast, the shorter, aligned exposure time minimizes motion blur and enables quick, accurate capture of barcodes on fast-moving items.

In some embodiments, the system implements a dual-mode approach in which both the alignment state between the illumination frequency and the image sensor frequency, as well as the exposure time of the image sensor, are alternated in a coordinated manner. This dual-mode system enables the device to optimize scanning performance across a wide range of use cases—achieving high sensitivity for electronic codes, such as QR codes displayed on mobile devices, while also providing rapid, blur-resistant scanning for conventional barcodes on physical products.

Figure 7:
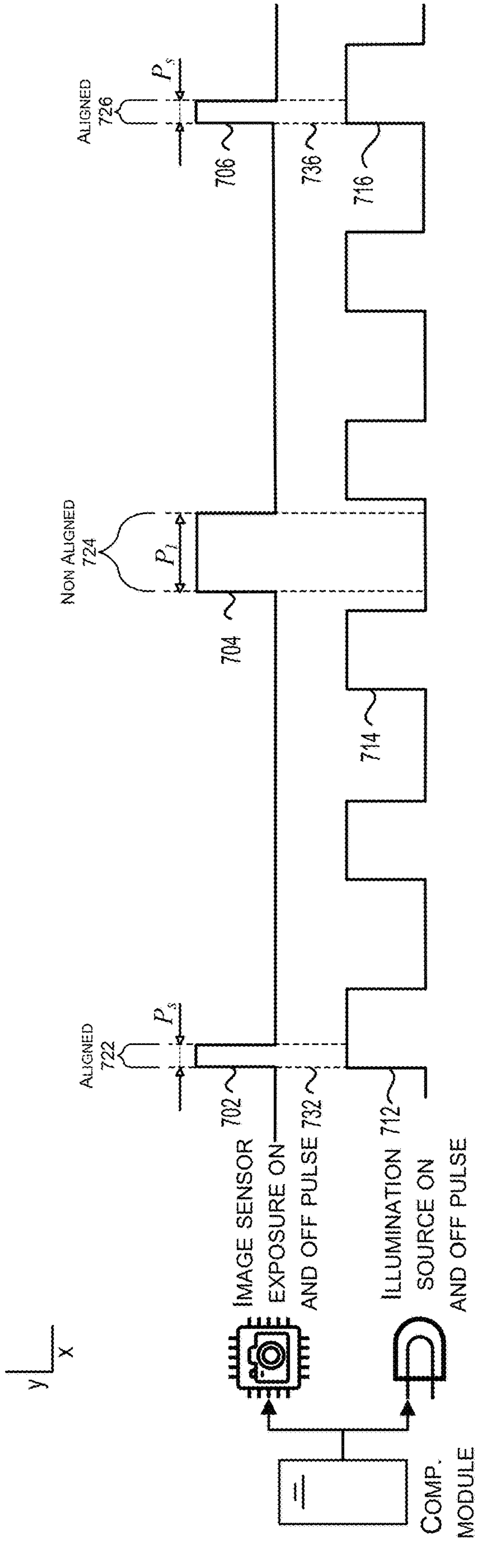
FIG. 7 illustrates an exemplary timing arrangement in which the alignment state between the image sensor and the illumination source alternates from frame to frame, according to at least one example.

FIG. 7 illustrates an example timing diagram for an image sensor and an illumination source, in which the exposure times associated with the sensor on and off pulses differ from frame to frame. In this diagram, image sensor on pulses 702 and 706 are each associated with a uniform, shorter exposure time, denoted as Ps, while image sensor on pulse 704 is associated with a longer exposure time, denoted as PI. The system alternates these exposure durations to scanning performance.

Specifically, image sensor on pulses 702 and 706 are aligned with illumination source on pulses 712 and 714, respectively, at rising edges labeled 732 and 736. In this embodiment, the image sensor on pulse and the illumination source on pulse commence simultaneously, but do not conclude at the same time. During these aligned frames, the image sensor exposure period remains relatively short (Ps). By aligning only the start of the exposure and illumination events, while allowing the exposure to end before or independently of the illumination source on pulse's trailing edge, the system minimizes motion blur. This approach is particularly advantageous for capturing clear images of fast-moving items or barcodes. In contrast, image sensor on pulse 704 is not aligned with the illumination source on pulses; its exposure period (Pl) is offset from the timing of illumination source on pulses, resulting in a longer exposure time. This misaligned configuration allows the image sensor to gather additional ambient or reflected light, which can improve the detection and decoding of codes that are faint, dimly lit, or presented on electronic screens.

By alternating between aligned short exposure frames (e.g., at sensor on pulses 702 and 706) and misaligned longer exposure frames (e.g., at sensor on pulse 704), the system is able to both minimize motion blur and enhance the collection of ambient or reflected light. The system effectively balances the competing demands of sensitivity and speed, thereby enhancing overall accuracy, reliability, and user experience in automated retail and self-service environments. This combined approach improves scanning reliability for a variety of scenarios, including the accurate detection of fast-moving physical barcodes as well as electronic codes, such as QR codes displayed on mobile device screens.

The timing arrangements depicted in FIG. 7 are merely illustrative examples of certain embodiments that utilize both aligned and misaligned states between the image sensor and the illumination source. However, the type of alignment and the number of exposure durations are not limited to these exemplary timing schemes. In alternative embodiments, the image sensor on pulses may be partially aligned with the illumination source on pulses. For instance, the exposure window of the image sensor may overlap with only a portion of the illumination period, such that the image sensor begins integrating before the illumination source on pulse commences or continues integrating after the illumination pulse concludes. This partial alignment enables the system to capture image data reflecting a mixture of ambient and illuminated conditions, which can be advantageous for distinguishing ambient light effects from those induced by the illumination source, or for implementing advanced signal processing techniques such as background subtraction, dynamic range enhancement, or artifact reduction. Any type of alignment and number of exposure durations capable of achieving similar functionality as described herein are considered within the scope of the invention.

In some embodiments, the longer exposure time (misaligned frame) may be set to approximately 6.67 milliseconds, and the shorter exposure time (aligned frame) may be set to approximately 1 millisecond. In these embodiments, the illumination source may be operated at approximately 75 Hz. Experimental test results indicate that these settings achieve improved scanning performance across a range of use cases.

In some embodiments, system operations are initiated automatically in response to the detection of an object within the scanning area by a proximity sensor 330, which may be operably coupled to the computing module 320. The proximity sensor 330 serves as an input device that actively monitors the scanning area for the presence of items, packages, or electronic devices (such as smartphones displaying QR codes) to be scanned.

Figure 8:
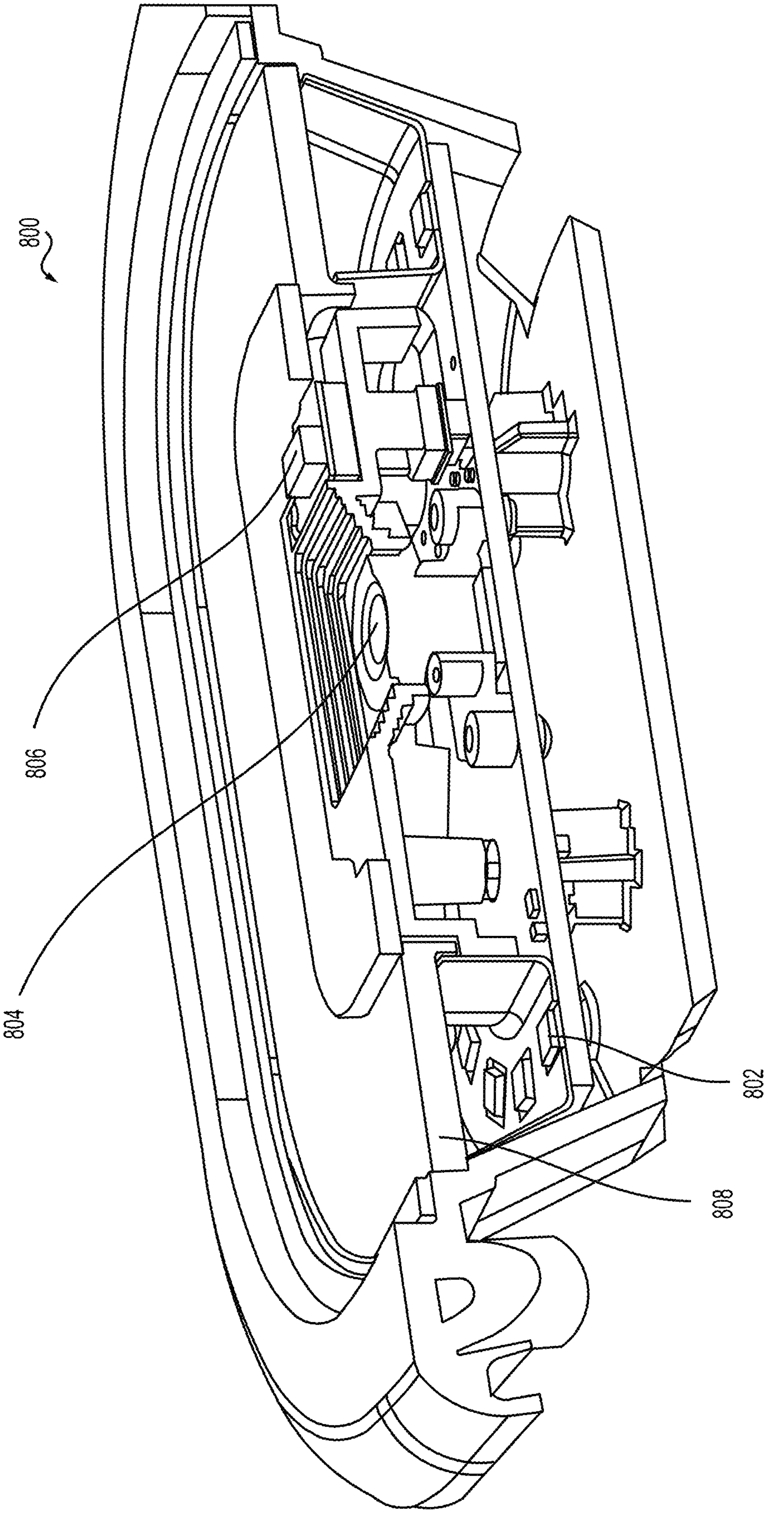
FIG. 8 illustrates a sectional view of an exemplary optical module, according to at least one example.

FIG. 8 illustrates a sectional view of an optical module 800. The optical module 800 is similar to the optical module 200 shown in FIG. 2 and may be used to perform code scanning operations within the mobile apparatus. The optical module 800 includes a plurality of illumination sources 802, an image sensor 804, and a proximity sensor 806. The plurality of illumination sources 802 are positioned beneath a cover 808. The cover 808 may be implemented as a transparent cover or, in some embodiments, as a diffusing plate configured to diffuse the emitted light and provide uniform illumination across the scanning area. The illumination sources 802 are arranged around the image sensor 804 to ensure consistent lighting for optimal code capture.

In some embodiments, prior to adjusting the illumination frequency or the exposure time of the image sensor 804 for scanning operations, the illumination source 802 may be maintained in a continuously-on or low-intensity mode. This persistent illumination serves as a visual indicator, clearly delineating the scanning area for the user and guiding them to present items or electronic codes within the optimal detection zone. The illumination source 802 may emit at a constant brightness or utilize a reduced power setting during idle periods, thereby balancing visibility for user guidance with energy efficiency.

In some embodiments, the illumination source 802 comprises one or more LEDs capable of emitting light in different colors. The use of different colored LEDs allows the system to provide additional visual cues or functions depending on the operational state or user interaction. For example, the illumination source 802 may emit white light during normal scanning operations to maximize code visibility, but switch to a different color (e.g., blue, green, or red) under certain conditions. A green LED could indicate a successful scan, while a red LED might signal an error or prompt the user to rescan an item. Alternatively, blue or amber illumination could be used to indicate standby or idle modes, or to guide the user in positioning items within the scanning area. The use of different colored LEDs also allows for advanced functions, such as color-coded feedback for different types of codes (e.g., product barcodes versus electronic QR codes), or for signaling maintenance or connectivity status. Additionally, the system may employ patterns or sequences of color changes to convey more complex information to the user or operator.

In some embodiments, system operations are initiated automatically in response to detection of an object within the scanning area by a proximity sensor 806, which may be operably coupled to a computing module (i.e., the computing module 320 discussed with reference to FIG. 3). The proximity sensor 806 may be situated near the image sensor 804, enabling accurate detection of items or devices presented for scanning and facilitating the automatic initiation of scanning operations. Upon detecting the presence of an object, the proximity sensor 806 generates a signal that prompts the computing module to activate the optical module—including the image sensor 804 and the illumination source 802—transitioning the system from a low-power or sleep mode to an active operational state. This automated wake-up functionality conserves energy by ensuring the system remains in a power-saving mode during periods of inactivity, thereby extending battery life and increasing efficiency in mobile or self-service environments. Only when an object is detected within the scanning area does the system fully power on the optical components and initiate scanning operations, enhancing system responsiveness and optimizing power consumption. According to some embodiments, upon detecting the presence of an object, the proximity sensor 806 generates a signal that prompts the computing module to adjust the illumination frequency of illumination source 802. The adjustment process may involve decreasing the illumination frequency from a default or standby operating value to a lower frequency that is better suited for optimal scanning conditions. During this transition from the initial frequency to the adjusted frequency, the system can be configured to maintain a consistent illumination magnitude, meaning that the intensity or brightness of the light emitted by the illumination source 802 remains substantially unchanged throughout the adjustment process.

The proximity sensor 806 may be implemented as a time-of-flight (TOF) sensor, which operates by emitting pulses of light (e.g., infrared) and measuring the time taken for the reflected light to return after striking an object. This measurement allows the sensor to accurately determine both the presence and the distance of objects within the scanning area. Leveraging TOF technology, the system can quickly and reliably detect when a user presents an item for scanning, enabling prompt activation of the scanning components only when necessary and further reducing power usage.

Alternatively, the proximity sensor 806 may be implemented using other technologies, such as infrared (IR) reflection sensors, ultrasonic sensors, capacitive sensors, or radar sensors. For example, an IR sensor can detect objects by monitoring changes in the intensity of reflected infrared light; ultrasonic sensors determine object presence based on the reflection of high-frequency sound waves; capacitive sensors identify changes in the electric field caused by the introduction of a conductive object (such as a hand or product); and radar sensors detect objects using radio waves. The proximity sensor 806 may also be configured with adjustable sensitivity or multiple detection zones to accommodate various cart designs and user behaviors.

In more embodiments, the proximity sensor 806 may be implemented as an array of sensors or may incorporate additional signal processing algorithms to enhance detection accuracy, filter out background noise, and distinguish between relevant objects (such as items or devices to be scanned) and irrelevant movements in the surrounding environment. Regardless of the technology employed, the proximity sensor 806 is communicatively linked to the computing module 320, which processes the sensor signals and initiates system operations as appropriate.

In some embodiments, the illumination source 802 may be maintained in a continuously-on or low-intensity mode. Upon detection of an object in the scanning area, such as by the proximity sensor 806, the system may then transition the illumination source 802 to an operational mode, adjusting the frequency and/or intensity as required for optimal code capture and initiating the coordinated exposure timing of the image sensor 804. This approach not only enhances the user experience by providing intuitive feedback regarding the scanning location, but also ensures that power consumption is minimized during periods of inactivity, contributing to overall system efficiency.

In some embodiments, the proximity sensor 806 may be disposed outside of the optical module 800, rather than being integrated within it. For example, the proximity sensor may be mounted on a different portion of the device housing, positioned in a location that is physically separated from the optical module but still capable of effectively detecting the presence, distance, or movement of objects relative to the device. This arrangement can provide greater flexibility in device design, allowing for optimization of sensor placement based on ergonomic, aesthetic, or functional considerations. This embodiment is not limited to the examples described herein, and any configuration in which the proximity sensor is disposed separately from the optical module is considered within the scope of the invention.

Figure 9:
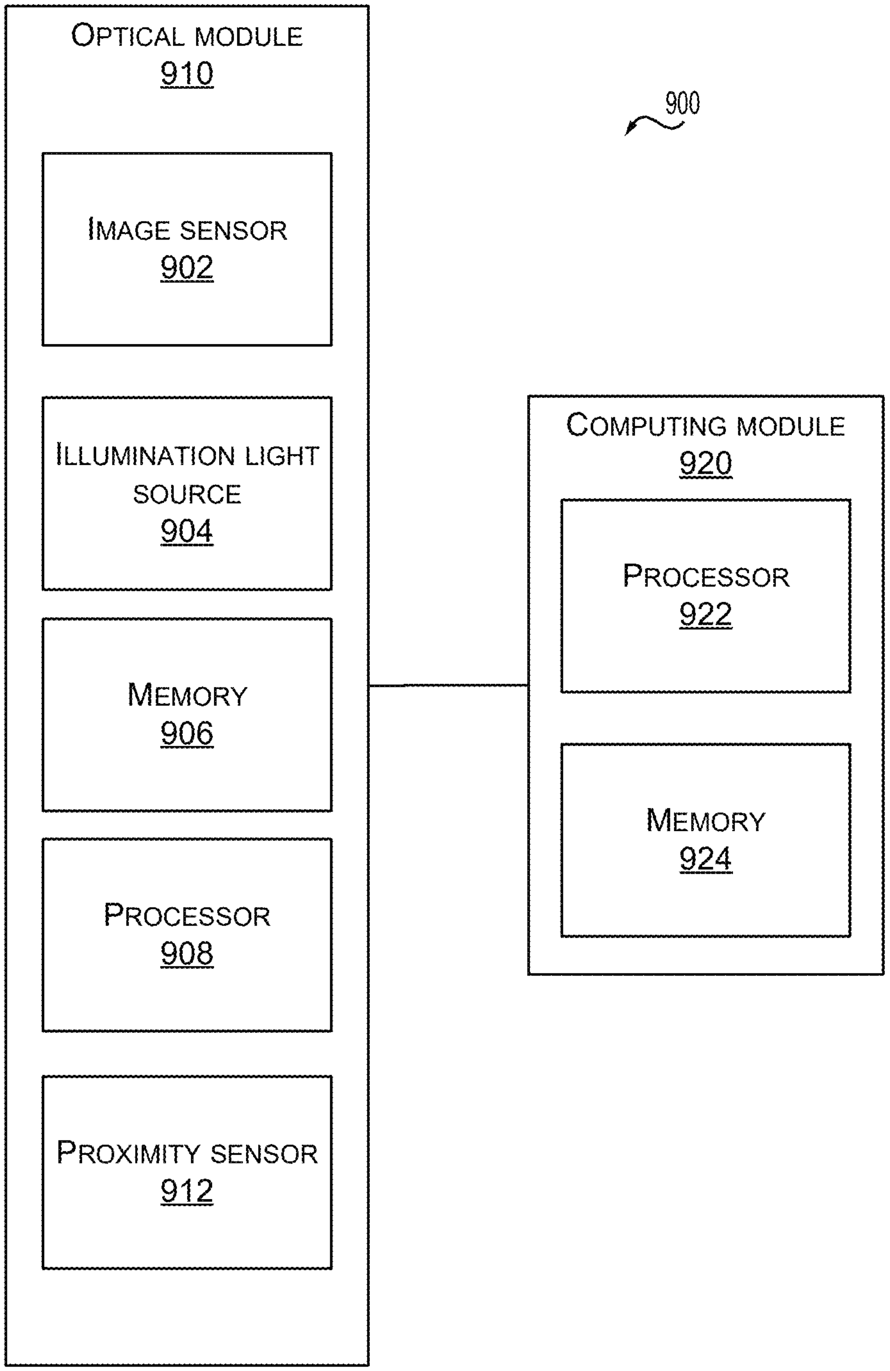
FIG. 9 illustrates an example scanning system, according to at least one example.

In some embodiments, as illustrated in FIG. 9, the system 900 includes an optical module 910 and a computing module 920. The optical module 910 is similar to the optical module 200 shown in FIG. 2 and may be used to perform code scanning operations within the mobile apparatus. The optical module 910 is configured to perform local processing of scanning data and may be implemented as a pulse illumination (PI) camera system. The optical module 910 comprises an image sensor 902, such as a camera or photodiode array, capable of capturing image data or code information (e.g., barcodes or QR codes) within a designated scanning area, as well as an illumination source 904, arranged to provide optimal lighting for code detection. The optical module 910 further includes a processor 908 and a memory 906, which may be implemented as one or more non-transitory computer-readable storage media storing instructions for controlling the operation of the image sensor 902 and illumination source 904. The optical module 910 may further include a proximity sensor 912 like the proximity sensor 806 discussed above related to FIG. 8. Upon detecting the presence of an object, the proximity sensor 912 generates a signal that prompts the processor 908 to activate the image sensor 902 and illumination source 904 from a low-power or sleep mode to an active operational state. In some instances, upon detecting the presence of an object, the proximity sensor 912 generates a signal that prompts the processor 908 to adjust the illumination frequency of the illumination source 904.

In some embodiments, the processor 908 may also process the raw scanning data generated by the image sensor 902 and produce metadata summarizing relevant information from the scan. This metadata may include, for example, decoded code values (e.g., code values obtained from images captured without the interference of reflected illumination), scan timestamps, quality metrics, or abstracted data representations based on the captured image. Rather than transmitting full-resolution images or unprocessed sensor data, the optical module 910 generates concise metadata and sends it directly to the computing module 920, which is separate from the optical module. This local processing approach significantly reduces the need to transmit large volumes of image data, thereby conserving bandwidth and minimizing power consumption, and enabling faster response.

The computing module 920 may be implemented as a main computing system responsible for higher-level functions such as transaction management, inventory updating, user interface presentation, or customer data management. In some embodiments, the computing module 920 may further connect to, or be implemented as, a remote computing system or database, thereby enabling cloud-based processing or data storage. The main computing module 920 may comprise a processor 922 and a memory 924, which receive and process the metadata transmitted from the optical module 910 for further business logic, display, analytics, or network communication.

By delegating all initial scanning data processing to the dedicated processor 908 within the optical module 910 (e.g., the PI camera), the system architecture enables efficient operation, reduces data transfer requirements, and optimizes resource usage, which is particularly advantageous for battery-powered, mobile, or distributed retail environments. This arrangement allows the optical module 910 to operate semi-autonomously, transmitting only concise, actionable metadata to the main computing infrastructure for further application-level processing. As a result, the system achieves significant benefits in terms of power efficiency, modularity, real-time responsiveness, and scalability for advanced retail and self-service implementations.

Some or all of the process 1000 and 1100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
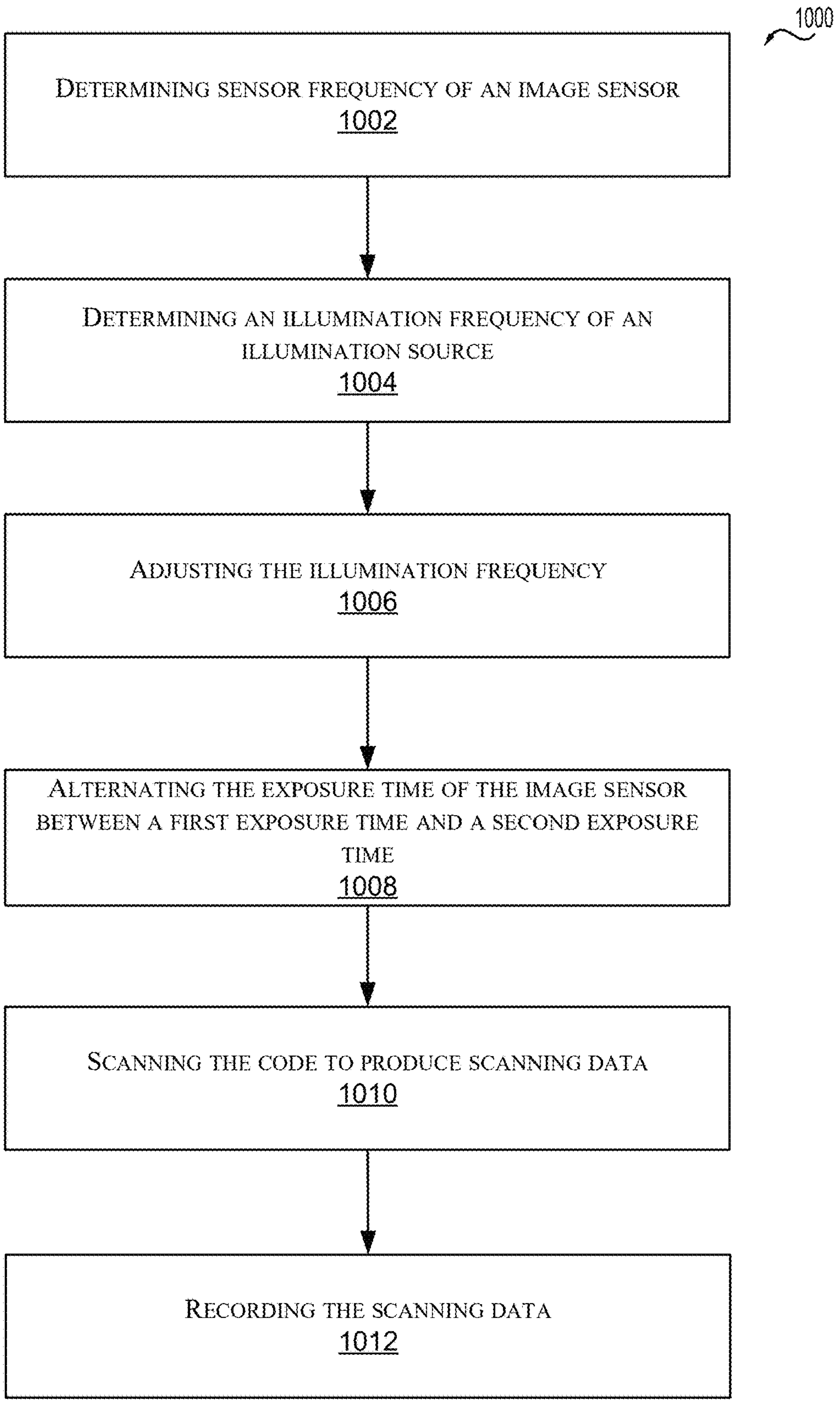
FIG. 10 illustrates an example flowchart depicting a process for code scanning using an image sensor and illumination source in a smart shopping environment, according to at least one example.

Referring to FIG. 10, at block 1002, the system determines a image sensor frequency for the image sensor. The image sensor may be similar to the image sensor 302 as illustrated in FIG. 3. The image sensor frequency initiates each scan by the image sensor 302 to scan a scanning area, such as an area adjacent to or within the frame of a smart shopping cart. In some embodiments, the image sensor frequency is set to about 30 Hz. In alternative embodiments, the image sensor frequency may be dynamically adjusted based on environmental conditions or user input. The image sensor frequency defines the rate at which the image sensor 302 is triggered to capture images or scan codes within a designated scanning area. The specific manner in which the image sensor frequency governs the triggering of the image sensor 302 can be further understood with reference to FIGS. 6 and 7, which illustrate example timing sequences and operational scenarios for image capture and code scanning within the system.

At block 1004, the system determines an illumination frequency for the illumination source. The illumination source may be similar to the illumination source 304 as illustrated in FIG. 3. The illumination frequency defines the rate at which the illumination source 304 is activated to provide illumination to the scanning area. Specifically, the illumination frequency governs how often the illumination source is triggered or pulsed to emit light, thereby enabling optimal lighting conditions for image capture or code scanning. The relationship between the illumination frequency and the activation of the illumination source, including timing sequences and alignment with the image sensor frequency, can be further understood with reference to FIGS. 6 and 7, which illustrate example operational timings and scenarios for coordinated image capture and illumination.

At block 1006, the system adjusts the illumination frequency such that the image sensor frequency and the illumination frequency are intermittently aligned, with one or more misaligned frames occurring between aligned frames. Aligned frames are frames in which the activation of the illumination source is aligned with an exposure period of the image sensor during scanning. For example, as illustrated in FIG. 6, a aligned frame may occur when the image sensor on pulse 602 partially or fully aligns with the illumination source on pulse 612, or when the image sensor on pulse 606 partially or fully aligns with the illumination source on pulse 616. In contrast, misaligned frames are frames in which the activation of the illumination source is offset from the exposure period of the image sensor; for instance, a misaligned frame may be represented by the image sensor on pulse 604 occurring when there is no corresponding illumination source on pulse, as shown in FIG. 6. It will be appreciated that the alignment configurations depicted in FIG. 6 are merely illustrative, and the aligned and misaligned statuses are not limited to these specific examples. The aligned and misaligned states may correspond to periods of full, partial, or no overlap between the image sensor exposure on pulses and the illumination source on pulses.

In alternative embodiments, adjusting the illumination frequency may comprise decreasing the illumination frequency, increasing the illumination frequency, or varying the illumination frequency dynamically based on operational conditions. The system may also adjust the image sensor frequency alone or in combination with the illumination frequency.

In some embodiments, at block 1008, the system alternates the exposure time of the image sensor between a first exposure time and a second exposure time. Alignment of the illumination frequency with the image sensor frequency is performed for the second exposure time, and misalignment is performed for the first exposure time. The first exposure time may be longer than the second exposure time. For example, as illustrated in FIG. 7, the exposure time associated with image sensor on pulses 702 and 706 are shorter in duration than the exposure time associated with image sensor on pulse 704. This demonstrates an alternation between shorter and longer exposure periods within the scanning sequence according to some embodiments.

In some embodiments, the first exposure time may be not greater than 4.7 milliseconds, and the second exposure time may be less than 0.2 milliseconds. In some scenarios, the exposure time may be adjusted to optimize for sensitivity (longer exposure) or motion-blur resistance (shorter exposure), depending on the type of code (e.g., barcode, QR code) and presentation conditions.

It should be appreciated that alternating the exposure time as described is an optional enhancement that may provide improved performance under certain conditions, but is not required for the operation of the system. In other embodiments, this step may be omitted entirely, and the exposure time may instead remain fixed or be otherwise adjusted by alternative means.

At block 1010, the system scans the code, by the image sensor, to produce scanning data. The code may comprise any machine-readable code, such as a barcode or a QR code. The scanning data may include image data, decoded code information, timestamps, quality metrics, or any other sensor outputs relevant to the code detection event. In alternative embodiments, the scanning step may be repeated for a plurality of consecutive aligned frames, followed by at least one misaligned frame, and subsequently followed by one or more additional aligned frames, thereby creating a repeating sequence of aligned frames and misaligned frames.

At block 1012, the system records the scanning data to the computing module. The computing module may be similar to the computing module 320 as illustrated in FIG. 3. The computing module may include a processor and a non-transitory memory as described above. In some embodiments, the system is further configured to generate metadata from the scanning data, including but not limited to decoded values, scan timestamps, or quality metrics, and to send the metadata to a second processor for further processing, such as transaction management, inventory tracking, or user interface display. In some embodiments, the scanning data and/or metadata may be transmitted to a remote server or cloud-based system for additional analysis or storage.

The process 1000, as exemplified in FIG. 10, enables flexible, adaptive, and efficient code scanning by integrating control over sensor and illumination frequencies, alignment states, and exposure timing. The system may optimize scanning accuracy and reliability for both printed and electronic codes, and may be used in a variety of environments, including but not limited to shopping carts, self-checkout kiosks, or handheld code scanners.

Figure 11:
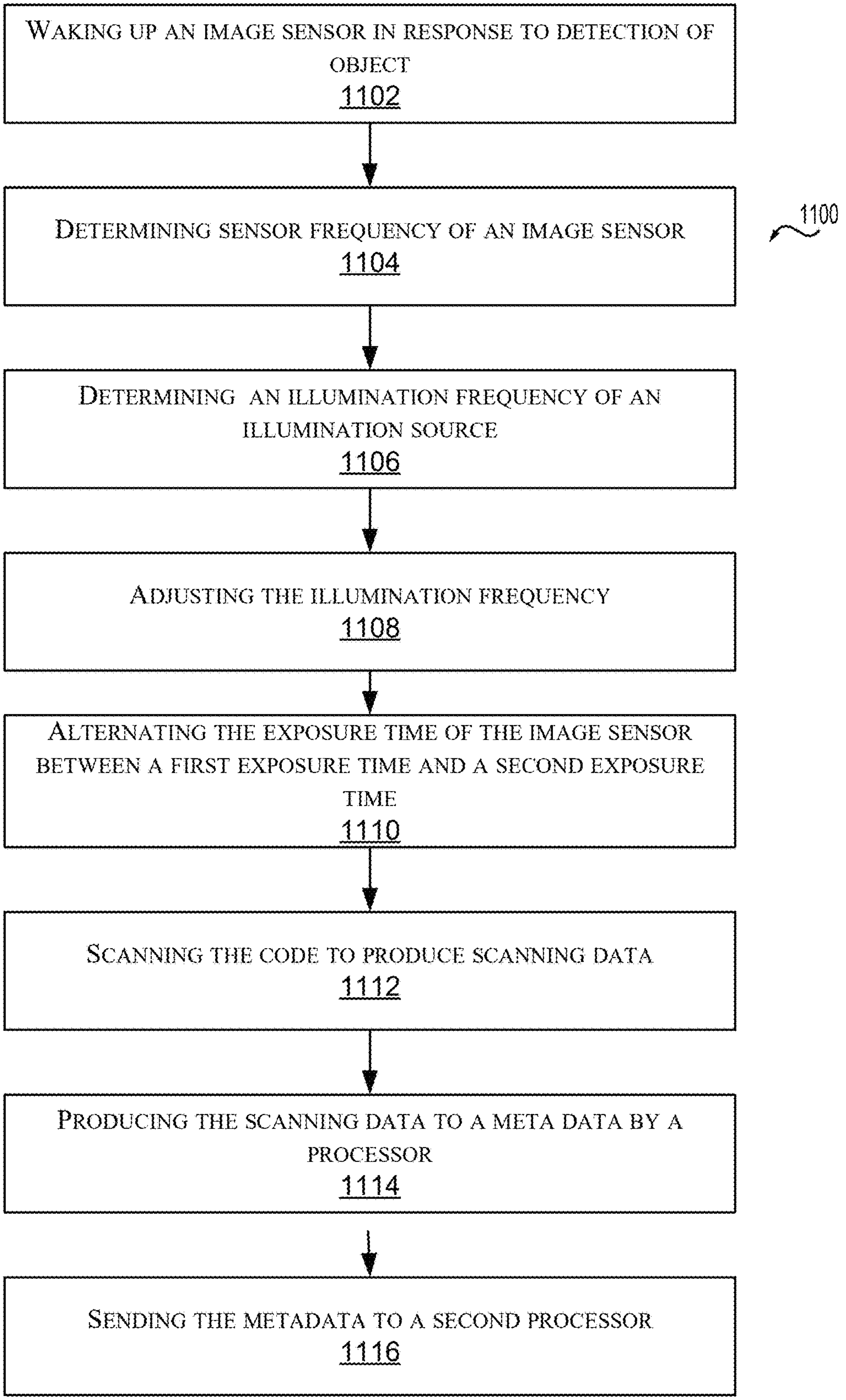
FIG. 11 illustrates another example flowchart depicting a process for code scanning using a proximity sensor in a smart shopping environment, according to at least one example.

FIG. 11 illustrates another example process 1100 for code scanning in a smart shopping environment. At block 1102, the system wakes up the image sensor in response to detection of an object within the scanning area. The object may be detected by a proximity sensor, which may comprise a time-of-flight (TOF) sensor or any other suitable proximity detection device. The proximity sensor may be similar to the proximity sensor 330 as illustrated in FIG. 3.

In some embodiments, the illumination source is maintained in a continuously on state during the period prior to and up to the step of adjusting the illumination frequency for the optical module, such that the illumination source remains steadily illuminated until the illumination frequency is adjusted. In this context, "continuously on" means that the illumination source is steadily illuminated, rather than being pulsed or intermittently activated. Maintaining the illumination source in this mode serves two primary purposes. First, it provides a clear visual indication of the location and boundaries of the scanning area, thereby assisting users in properly positioning objects or codes for scanning. Second, the continuous lighting enhances the performance of the proximity sensor—such as an infrared or time-of-flight (TOF) sensor—by ensuring that the scanning area is consistently illuminated, which improves the accuracy and reliability of object detection. This dual function of the continuously on illumination source facilitates intuitive user interaction and enables the system to promptly and accurately detect when an object is present in the scanning area, thereby supporting efficient wake-up operations or the transition to active scanning modes. Once the process advances to adjusting the illumination frequency for the optical module, the system may transition the illumination source from the continuously on state to a pulsed or otherwise dynamically controlled operating mode as appropriate for subsequent scanning operations.

At block 1104, the system determines the image sensor frequency for the image sensor, and at block 1106, determines the illumination frequency for the illumination source, thereby establishing the operational timing for image capture and illumination. The steps of determining the image sensor frequency and the illumination frequency are similar to those described above with respect to steps 1002 and 1004. The frequencies may be established based on default system settings, user input, environmental conditions (such as ambient lighting or object movement), or predefined scanning protocols stored in memory.

At block 1108, the system adjusts the illumination frequency such that the image sensor frequency and the illumination frequency are intermittently aligned, with one or more misaligned frames occurring between aligned frames. Aligned frames are frames in which the activation of the illumination source is aligned with an exposure period of the image sensor during scanning. For example, as illustrated in FIG. 6, an aligned frame may occur when the image sensor on pulse 602 partially or fully aligns with the illumination source on pulse 612, or when the image sensor on pulse 606 partially or fully aligns with the illumination source on pulse 616. In contrast, misaligned frames are frames in which the activation of the illumination source is offset from the exposure period of the image sensor; for instance, a misaligned frame may be represented by the image sensor on pulse 606 occurring when there is no corresponding illumination source on pulse, as shown in FIG. 6.

In alternative embodiments, adjusting the illumination frequency may comprise decreasing the illumination frequency, increasing the illumination frequency, or varying the illumination frequency dynamically based on operational conditions. The system may also adjust the image sensor frequency alone or in combination with the illumination frequency.

At block 1110, as included according to some embodiments, the system alternates the exposure time of the image sensor between a first exposure time and a second exposure time. Alignment of the illumination frequency with the image sensor frequency is performed for the second exposure time, and misalignment is performed for the first exposure time. The first exposure time may be longer than the second exposure time. For example, as illustrated in FIG. 7, the exposure times associated with image sensor on pulse 702 are shorter in duration than the exposure time associated with image sensor on pulse 704. This demonstrates an alternation between shorter and longer exposure periods within the scanning sequence according to some embodiments. The timing arrangements depicted in FIG. 7 are merely illustrative examples of certain embodiments that utilize both aligned and misaligned states between the image sensor and the illumination source. Any type of alignment and number of exposure durations capable of achieving similar functionality as described herein are considered within the scope of the invention.

In some embodiments, the first exposure time may be not greater than 4.7 milliseconds, and the second exposure time may be less than 0.2 milliseconds. In some scenarios, the exposure time may be adjusted to optimize for sensitivity (longer exposure) or motion-blur resistance (shorter exposure), depending on the type of code (e.g., barcode, QR code) and presentation conditions.

It should be appreciated that alternating the exposure time as described is an optional enhancement that may provide improved performance under certain conditions, but is not required for the operation of the system. In other embodiments, this step may be omitted entirely, and the exposure time may instead remain fixed or be otherwise adjusted by alternative means.

At block 1112, the system scans the code using the image sensor to generate scanning data. The code may comprise any machine-readable code, such as a barcode or a QR code. The scanning data may include image data, decoded code information, timestamps, quality metrics, or any other sensor outputs relevant to the code detection event. In alternative embodiments, the scanning step may be repeated for a plurality of consecutive aligned frames, followed by at least one misaligned frame, and subsequently followed by one or more additional aligned frames, thereby creating a repeating sequence of aligned frames and misaligned frames.

At block 1114, the scanning data is processed by a processor to produce metadata. The metadata may include, but is not limited to, decoded code values (e.g., alphanumeric data extracted from the scanned code), scan timestamps (e.g., record the precise time at which each code was scanned), quality metrics (e.g., measures of image clarity, code legibility, or scan confidence level), or other relevant information derived from the scanning operation. In some embodiments, the metadata may also encompass information such as the type of code detected (e.g., barcode, QR code), the location within the scanning area where the code was detected, error correction data, or identifiers associated with the scanning device or session. This processing step can be executed locally by the processor 908 within the optical module 910, as shown in FIG. 9. Alternatively, processing may be distributed across multiple processing units or subsystems to enhance efficiency, scalability, or redundancy, depending on the system configuration.

At block 1116, the generated metadata is transmitted to a second processor, such as the processor 922 depicted in FIG. 9. This second processor may be part of a main computing module tasked with performing higher-level system functions, including, but not limited to, transaction management (e.g., initiating and updating purchase records), inventory updating (e.g., adjusting inventory counts in response to scanned items), or user interface display (e.g., presenting scan results or system status to the user). In some embodiments, the system may further transmit the metadata to a remote server or cloud-based platform for additional processing, long-term storage, advanced analytics, or integration with external systems. This allows for centralized data management, enhanced analytics capabilities, and improved scalability or interoperability with other retail, inventory, or analytics platforms.

The process 1100, as depicted in FIG. 11, demonstrates a workflow for adaptive, efficient, and scalable code scanning in a smart shopping environment. By incorporating object detection for wake-up, dynamic frequency adjustment, alternating exposure times, local metadata generation, and distributed processing, the system achieves enhanced performance, reduced power consumption, and improved user experience for both printed and electronic code scanning applications. In alternative embodiments, any of the steps may be omitted, performed in a different order, or combined with additional steps such as error correction, authentication, or network communication, as required for a given implementation.

Figure 12:
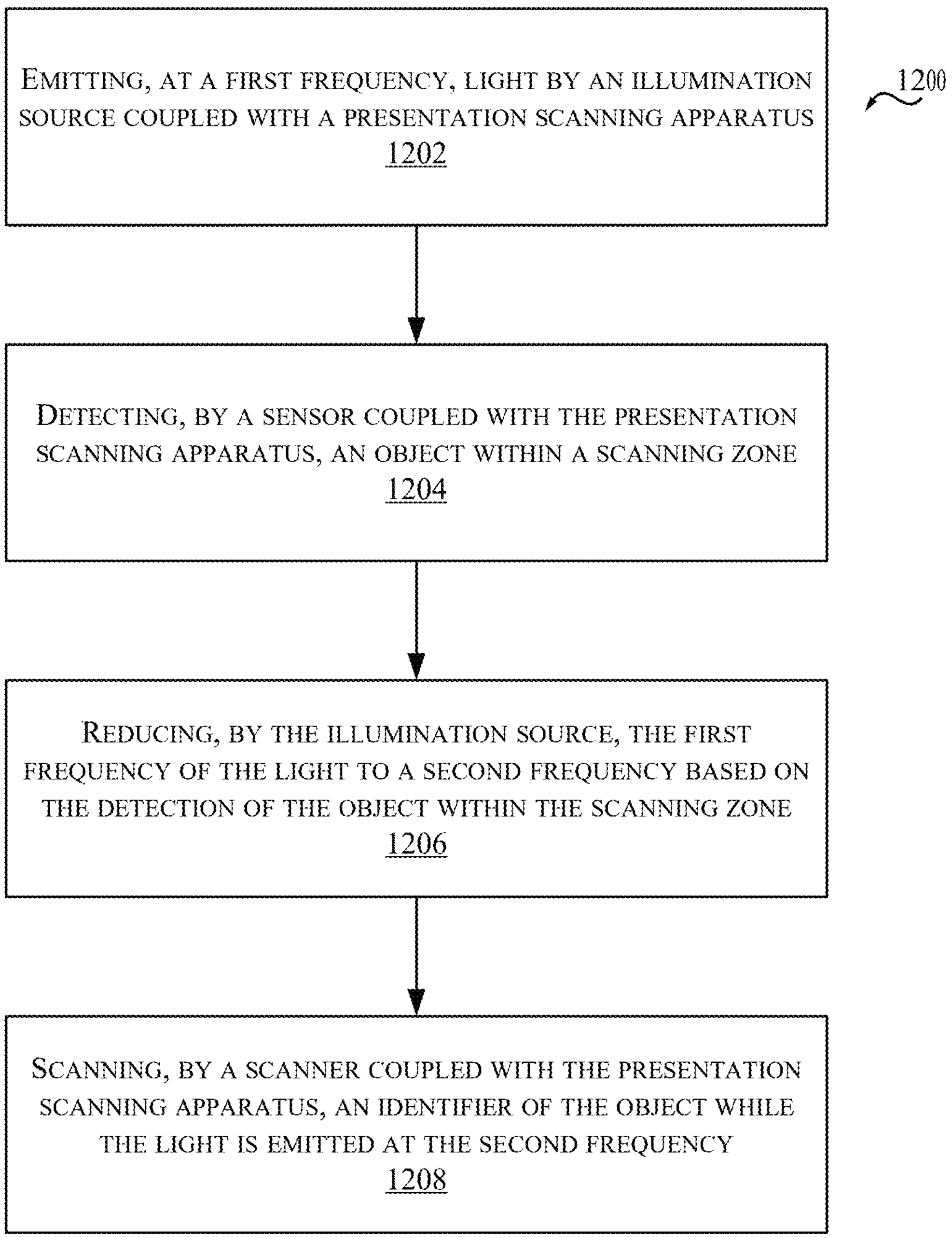
FIG. 12 illustrates an example flowchart depicting a process for dynamic scanning frequency adjustment, according to at least one example.

FIG. 12 illustrates an example flowchart depicting a process 1200 for dynamic illumination frequency adjustment of a presentation scanning apparatus. In some embodiments, the process 1200 may be performed by components of the system 300. The presentation scanning apparatus may be similar to the optical module 200 as illustrated in FIG. 2. At block 1202, a light is emitted at a first frequency by an illumination source coupled with the presentation scanning apparatus. The illumination source may be the same as illumination source 204 as illustrated in FIG. 2. According to some embodiments, the illumination source is a visible spectrum light emitter. The illumination source may be a light emitting diode (LED), laser diode, or other photonic emitter that is integrally or operatively coupled with the presentation scanning apparatus. The first frequency at which the light is emitted can be selected to optimize initial detection conditions, taking into account ambient lighting, energy efficiency, and the requirements of the sensor and scanner. The illumination source may be positioned to provide coverage of a scanning zone, which could be an area in above a smart cart for a user to scan items prior to placing the items in the cart.

At block 1204, an object is detected within a scanning zone by a sensor coupled with the presentation scanning apparatus. According to some embodiments, the scanning zone is defined by the sensor, and the scanning zone is an area within which at item can be scanned. The sensor may be proximity sensor 220 as illustrated in FIG. 2. The proximity sensor may be a time-of-flight (ToF) sensor to monitor the defined scanning zone for the presence of object. The scanning zone may be scanning area 210, as illustrated in FIG. 2, and may be dynamically defined based on the system's calibration and the physical layout or presentation area. Sensor data may be continuously or periodically evaluated to identify changes indicating the presence, movement, or removal of objects.

At block 1206, the first frequency of the light is reduced, by the illumination source, to a second frequency based on the detection of the object within the scanning zone. The second frequency may be selected based on preconfigured parameters, real-time environmental assessments, or machine learning algorithms that predict optimal scanning conditions based on historical data.

At block 1208, an identifier of the object is scanned by a scanner coupled with the presentation scanning apparatus at the second frequency. The scanner may be image sensor 202 as illustrated in FIG. 2. According to some embodiments, scanning data of the scanner may be processed to determine whether the scan is successful. According to some embodiments, determining whether the scan was successful includes analyzing an image generated by the scanner.

According to some embodiments, in response to determining that the scan is unsuccessful, provide a prompt, on a display of the presentation scanning apparatus, for additional information. According to some embodiments, in response to determining that the scan is unsuccessful, further decreasing the frequency of the light emitted by the illumination source. According to some embodiments, in response to determining that the scan was unsuccessful, determining whether the second frequency of the light signals emitted by the illumination source light emitter is below a threshold; and in accordance with the determination that the second frequency is below the threshold, providing a prompt for additional information. For example, the scanner may be a barcode reader, RFID interrogator, camera-based vision system, or other identifier-detection hardware to attempt to read or capture the object's unique identifier (such as a barcode, SKU, or visual feature set) at the second, reduced frequency.

In some embodiments, the computing module and/or control circuit may dynamically adjust the illumination frequency of the illumination source 204 in response to image data generated by the image sensor 202 while an object is within the scanning zone. As frames are acquired, software components can evaluate decode confidence, symbol contrast, exposure characteristics, temporal modulation cues, and motion blur, and command the illumination source 204 to shift the modulation frequency accordingly. For example, if the image sensor 202 and/or associated software components indicate low decode confidence or insufficient periodic modulation for identifier detection, the illumination frequency may be decreased toward a lower range to enhance temporal resolution for the scanner; conversely, if perceptible flicker is detected or no object is present near the optical module 200, the illumination frequency may be increased toward a higher range to restore continuous, flicker-free illumination. These adjustments may be performed in real time during an active scan while maintaining a substantially consistent illumination magnitude so that there is not a spike in illumination during the transition, and may utilize hysteresis thresholds, minimum dwell times, and/or debounce intervals to reduce oscillation during intermittent detections.

In further embodiments, the presentation scanning apparatus may implement a multi-frequency sampling routine to improve robustness under varying ambient lighting and motion conditions. Upon detecting an object within the scanning zone, the computing module and/or control circuit may initiate short acquisition intervals at a sequence of discrete illumination frequencies (e.g., approximately 30 Hz, 120 Hz, 1 kHz, 5 kHz, and 15 kHz), with the image sensor 202 attempting a decode at each step and the software components scoring results based on confidence and signal quality criteria. The system may then select an effective frequency for continued scanning and optionally refine around that value using incremental adjustments; upon a successful decode, expiration of a scan timeout, or detection that the object has been removed from the scanning zone, the illumination frequency may be increased toward a higher setting to provide flicker-free illumination. Throughout these operations, the illumination magnitude of the illumination source 204 may remain substantially consistent so that there is not a spike in illumination during frequency transitions.

According to some embodiments, upon detecting that the object is not within the scanning zone, the frequency of the light may be increased by the illumination source. In scenarios where the apparatus determines that no object is currently present within the scanning zone, for example, due to item removal, scan completion, or a period of inactivity, the system may proactively increase the frequency of the illumination source back to its original or standby value. According to some embodiments, detecting that an object is within a scanning zone can include detecting, by the proximity sensor, that the object is within a first distance of the presentation scanning apparatus. The frequency of light emitted by the illumination source can be reduced based at least in part on the first distance between the object and the presentation scanning apparatus. The proximity sensor can then detect that the object is at a second distance with respect to the presentation scanning apparatus. Accordingly, the frequency of the light emitted by the illumination source can be increased based at least in part on the object having moved to the second distance with respect to the presentation scanning apparatus. According to some embodiments, the illumination magnitude of the illumination source remains consistent as the frequency changes. According to some embodiments, the first distance is less than the second distance, thus the object is closer to the presentation scanning apparatus at the first distance.

According to some embodiments an illumination magnitude is consistent as the frequency changes. The illumination frequency, i.e., the intensity of brightness of the emitted light, remains substantially unchanged, regardless of adjustment to the frequency. Consistent illumination ensures that the quality of image or identifier data captured by cameras or scanners does not degrade due to frequency-induced brightness fluctuations. Additionally, stable lighting enhances the visibility and comfort for users interacting with the apparatus. In alternative embodiments, any of the steps may be omitted, performed in a different order, or combined with additional steps such as error correction, authentication, or network communication, as required for a given implementation.

According to some embodiments, the illumination source 204 may be driven such that the total emitted light over a defined integration interval remains substantially constant while the illumination frequency (i.e., modulation frequency) changes. To achieve this, the computing module and/or control circuit may adjust the duty cycle of the illumination source 204 (e.g., the pulse duration or on-time within each modulation period) inversely with the selected frequency. For example, when the illumination frequency is increased (e.g., transitioning from tens of hertz to kilohertz), the on-time per period may be proportionally reduced; conversely, when the illumination frequency is decreased, the on-time may be proportionally increased. This control strategy maintains a consistent perceived illumination magnitude for users interacting with the system and/or utilizing the container while enabling frequency changes that optimize capture conditions for the image sensor 202 and associated scanner components. The duty-cycle adjustments may be executed as a controlled ramp or as discrete steps and may be bounded by hardware constraints such as minimum pulse width, driver current limits, and thermal considerations.

In some examples, the control circuit may enforce constant-light output targets over a rolling integration window (e.g., tens to hundreds of milliseconds) by computing an on-time schedule for the illumination source 204 at each selected illumination frequency. For instance, at a lower-frequency setting (e.g., approximately 30 Hz), the illumination source 204 may utilize a relatively longer on-time per modulation period to achieve the target integrated luminous output; at higher-frequency settings (e.g., approximately 10-20 kHz), the on-time per period may be reduced to a small fraction while maintaining substantially the same integrated output across the integration window. The computing module may optionally incorporate closed-loop feedback from a brightness sensor and/or utilize decode confidence metrics from the image sensor 202 to refine on-time targets, apply hysteresis thresholds and minimum dwell times to prevent oscillation, and coordinate duty-cycle updates with frequency transitions so that there is not a spike in illumination during the transition. This constant-light strategy helps maintain user comfort, minimize power transients, and reduce the risk of erroneous readings caused by abrupt brightness changes.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A smart shopping cart, comprising:

a frame having one or more wheels, configured for movement along a support surface;

an optical module attached to the frame, including:

an illumination source, configured to illuminate a scanning area; and an image sensor, configured to scan a code within the scanning area; and a computing module communicably coupled to the optical module, comprising a processor and a non-transitory memory having instructions stored thereon that, when executed, cause the processor to perform operations comprising:

determining a sensor frequency for the image sensor of the optical module;

determining an illumination frequency for the illumination source of the optical module;

adjusting the illumination frequency to define an adjusted illumination frequency, such that the sensor frequency and illumination frequency are intermittently aligned, with one or more misaligned frames occurring between aligned frames, wherein aligned frames are frames in which the illumination source and the image sensor are both active, and misaligned frames are frames in which one of the illumination source or the image sensor is inactive while the other of the illumination sources or the image sensor is active;

alternating an exposure time of the image sensor between a first exposure time and a second exposure time, wherein alignment of the illumination frequency with the sensor frequency is performed for the second exposure time and misalignment is performed for the first exposure time, the first exposure time being longer than the second exposure time;

scanning the code, by the image sensor, to produce scanning data; and recording the scanning data to the computing module.

2. The smart shopping cart of claim 1, wherein the operations are initiated in response to detection of an object within the scanning area by a proximity sensor.

3. The smart shopping cart of claim 1, wherein the operations further comprise: producing the scanning data to a metadata by the processor, and sending the metadata to a second processor.

4. The smart shopping cart of claim 1, wherein the illumination frequency is set so that the alignment with the sensor frequency occurs once every predetermined number of frames.

5. One or more non-transitory computer-readable storage media storing instructions that, upon execution by one or more processors of a system, cause the system to perform operations comprising:

determining a sensor frequency for an image sensor of an optical module;

determining an illumination frequency for an illumination source of the optical module;

adjusting the illumination frequency to define an adjusted illumination frequency, such that the sensor frequency and the illumination frequency are intermittently aligned, with one or more misaligned frames occurring between aligned frames, wherein aligned frames are frames in which the illumination source and the image sensor are both active, and misaligned frames are frames in which one of the illumination source or the image sensor is inactive while the other of the illumination source or the image sensor is active;

scanning a code to produce scanning data based at least in part on the adjusted illumination frequency; and recording the scanning data to the system.

6. The one or more non-transitory computer-readable storage media of claim 5, wherein adjusting the illumination frequency comprises adjusting the illumination frequency such that a plurality of consecutive aligned frames, is followed by at least one misaligned frame, and subsequently followed by one or more additional aligned frames, thereby creating a repeating sequence of aligned frames and misaligned frames.

7. The one or more non-transitory computer-readable storage media of claim 6, wherein the illumination frequency is set so that an alignment with the sensor frequency occurs once every predetermined number of frames.

8. The one or more non-transitory computer-readable storage media of claim 7, wherein the sensor frequency is about 30 Hz and the illumination frequency is about 105 Hz.

9. The one or more non-transitory computer-readable storage media of claim 5, further comprising additional instructions that, when executed by the one or more processors of the system, cause the system to perform additional operations comprising alternating an exposure time of the image sensor between a first exposure time and a second exposure time, wherein alignment of the illumination frequency with the sensor frequency is performed for the second exposure time and misalignment is performed for the first exposure time, the first exposure time being longer than the second exposure time.

10. The one or more non-transitory computer-readable storage media of claim 9, wherein the first exposure time is not greater than 4.7 milliseconds, and the second exposure time is less than 0.2 milliseconds.

11. The one or more non-transitory computer-readable storage media of claim 5, wherein the operations are initiated in response to detection of an object within a scanning area by a proximity sensor.

12. The one or more non-transitory computer-readable storage media of claim 11, wherein the proximity sensor comprises a time-of-flight (TOF) sensor.

13. The one or more non-transitory computer-readable storage media of claim 5, wherein the illumination source is maintained in a continuously on state during a period prior to and up to the step of adjusting the illumination frequency for the illumination source of the optical module, such that the illumination source remains steadily illuminated until the illumination frequency is adjusted.

14. The one or more non-transitory computer-readable storage media of claim 5, wherein the operations further comprise generating, by the processor, metadata from the scanning data, and sending the metadata to a second processor.

15. The one or more non-transitory computer-readable storage media of claim 5, wherein adjusting the illumination frequency comprises decreasing the illumination frequency.

16. The one or more non-transitory computer-readable storage media of claim 5, wherein the illumination source comprises a pulse illumination (PI) light.

17. The one or more non-transitory computer-readable storage media of claim 5, wherein the code comprises a QR code or a barcode.

18. A system, comprising:

a processor; and a memory storing instructions that, upon execution by the processor, configure the system to:

wake up an image sensor, in response to detection of an object within a scanning area;

receive a sensor frequency for the image sensor;

receive an illumination frequency for an illumination source;

adjust the sensor frequency and/or the illumination frequency, such that the sensor frequency and the illumination frequency are intermittently aligned, with one or more misaligned frames occurring between aligned frames, wherein aligned frames are frames in which the illumination source and the image sensor are both active, and misaligned frames are frames in which one of the illumination source or the image sensor is inactive while the other of the illumination source or the image sensor is active;

scan a code, by the image sensor, to produce scanning data based at least in part on the adjusted illumination frequency; and record the scanning data to the system.

19. The system of claim 18, wherein the system is further configured to produce the scanning data to a metadata by the processor, and send the metadata to a second processor.

20. The system of claim 18, further comprising instructions that, upon execution by the processor, configure the system to: intermittently set an exposure time of the image sensor to a first exposure time and a second exposure time, wherein alignment of the illumination frequency with the sensor frequency is performed for the second exposure time and misalignment is performed for the first exposure time, the first exposure time being longer than the second exposure time.

* * * * *